US008198868B2

(12) United States Patent
Pagano

(10) Patent No.: US 8,198,868 B2
(45) Date of Patent: Jun. 12, 2012

(54) POWER MANAGEMENT UNIT FOR A WIRELESS DEVICE

(75) Inventor: Rosario Pagano, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 330 days.

(21) Appl. No.: 12/708,127

(22) Filed: Feb. 18, 2010

(65) Prior Publication Data

US 2011/0175578 A1 Jul. 21, 2011

Related U.S. Application Data

(60) Provisional application No. 61/296,704, filed on Jan. 20, 2010.

(51) Int. Cl.
*H02J 7/06* (2006.01)
(52) U.S. Cl. ......... 320/164; 320/137; 320/139; 320/162
(58) Field of Classification Search .................... 320/164
See application file for complete search history.

(56) References Cited

U.S. PATENT DOCUMENTS

| 6,452,364 B1* | 9/2002 | Saeki et al. | 320/137 |
| 2005/0017676 A1* | 1/2005 | Takimoto et al. | 320/107 |
| 2008/0122405 A1* | 5/2008 | Fujikura | 320/149 |

* cited by examiner

*Primary Examiner* — Edward Tso
*Assistant Examiner* — Johali Torres Ruiz
(74) *Attorney, Agent, or Firm* — Sterne, Kessler, Goldstein & Fox, P.L.L.C.

(57) ABSTRACT

A method and apparatus is disclosed to restore or recharge one or more cells of a battery. A switching module sources an element charging current from a first input voltage to the battery when a charging control signal is at a first logical level or sinks an element discharging current from the battery to a second input voltage when the charging control signal is at a second logical level. A controller module provides the charging control signal based upon a comparison of a reference voltage and a control voltage pulse, the control voltage pulse being generated by the controller module in response to a replica current, the replica current being proportional to the element charging current. A feedback module compares a voltage of the battery to a reference voltage to provide a charging error signal. A reference voltage generator module provides the reference voltage in response to the charging error signal, the reference voltage being proportional to a constant current and a duty-cycle of the switching charger when the charging error signal indicates a first mode of operation or a scaled representation of the constant current when the charging error signal indicates a second mode of operation.

18 Claims, 15 Drawing Sheets

POWER MANAGEMENT UNIT FOR A WIRELESS DEVICE

CROSS-REFERENCE TO RELATED APPLICATIONS

The present application claims the benefit of U.S. Provisional Patent Appl. No. 61/296,704, filed Jan. 20, 2010, entitled "Power Management Unit for a Wireless Device," which is incorporated by reference herein in its entirety.

FIELD OF THE INVENTION

The present invention relates generally to a cellular phone and specifically to a power management unit for the cellular phone.

BACKGROUND

Cellular phones have evolved from large devices that were only capable of analog voice communications to comparatively smaller devices that are capable of digital voice communications and digital data communications, such as Short Message Service (SMS) for text messaging, email, packet switching for access to the Internet, gaming, Bluetooth, and Multimedia Messaging Service (MMS) to provide some examples. In addition to these capabilities, the cellular phones of today have additional non-communication related capabilities, such as a camera with video recording, an MPEG-1 Audio Layer 3 (MP3) player, and software applications such as a calendar and a phone book, to provide some examples. Even in light of these capabilities, manufacturers of cellular phones are placing even more capabilities into cellular phones and making these more power cellular phones smaller.

At the heart of each cellular phone lies a power management unit (PMU). The PMU is responsible for monitoring power connections and battery charges, charging batteries when necessary, and controlling power to other integrated circuits, as well other power functions of the cellular phone. The PMU may include a battery charger to charge or restore one or more batteries for the operation of the cellular phone. Conventionally, the battery charger includes a sensing resistor to measure the output current provided to the battery to ensure proper restoration of the battery. This sensing resistor, however, dissipates power, in the form of heat to provide an example, which could be otherwise used to restore the battery, thereby reducing an efficiency of the battery charger. Additionally, the battery charger may be implemented using one or more dies or chips, but because of their size, the sensing resistor is often implemented external to these dies or chips, thereby increasing the overall size of the battery charger.

Thus, there is a need for a battery charger to measure the output current provided to the battery to ensure proper restoration of the battery without the use of the sensing resistor that overcomes the shortcomings described above. Further aspects and advantages of the present invention will become apparent from the detailed description that follows.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1:
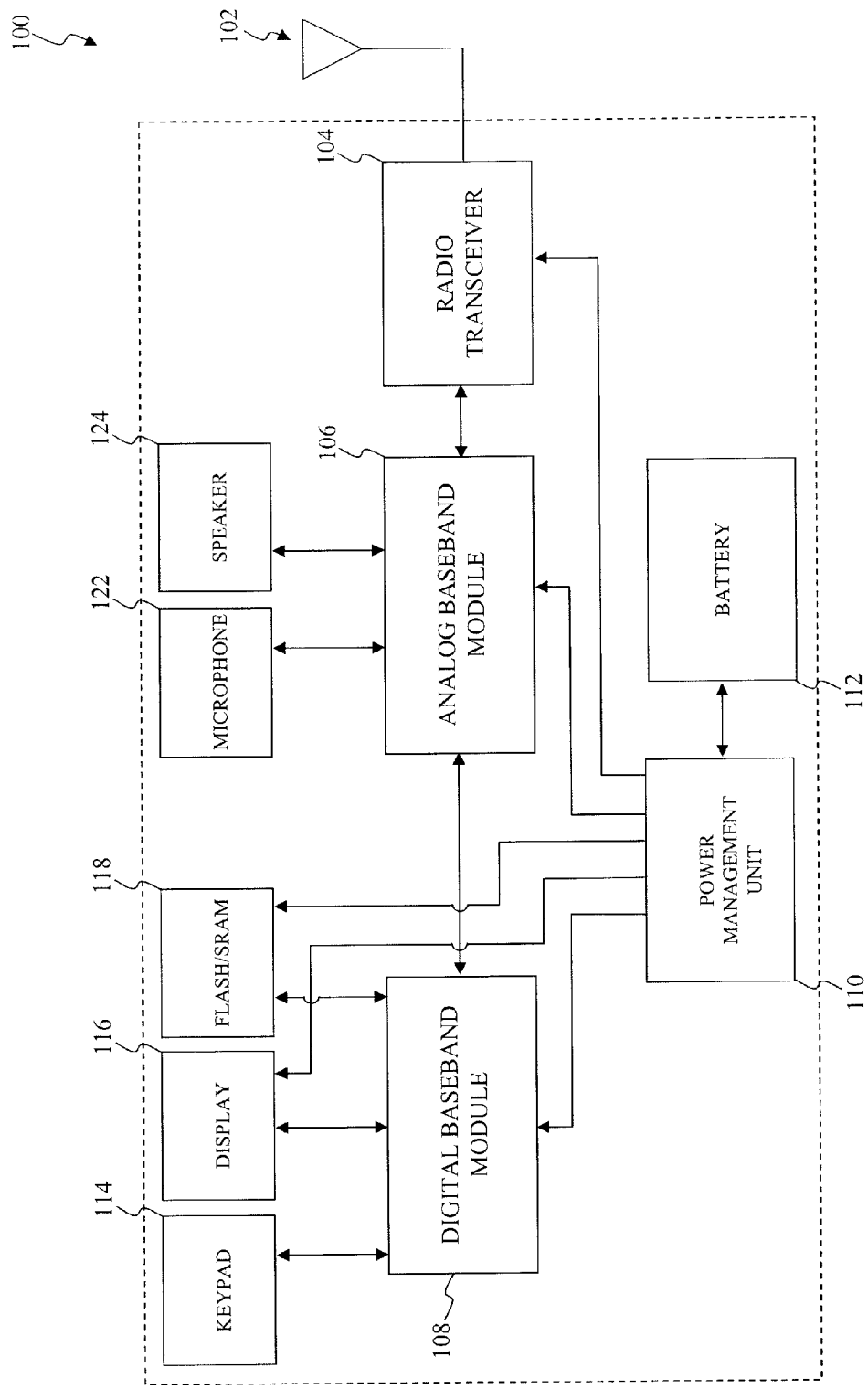
FIG. 1 illustrates a block diagram of a cellular phone according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment,"

"an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

It is further noted that particular bit values of logical one or logical zero (and representative voltage values) are used in illustrative examples provided herein to represent information for purposes of illustration only. Information described herein can be represented by either bit value (and by alternative voltage values), and embodiments described herein can be configured to operate on either bit value (and any representative voltage value), as would be understood by persons skilled in the relevant art(s).

Cellular Phone

FIG. 1 illustrates a block diagram of a cellular phone according to an exemplary embodiment of the present invention. A cellular phone 100 represents a communications device used for voice or data communications from a near-end user to a far-end user over a cellular network. The cellular phone 100 may communicate with one or more fixed location transceivers, referred to as cell sites, within the cellular network. The cell sites are connected to a cellular telephone exchange that connects to a public telephone network or to another cellular telephone exchange within the cellular network allowing the near-end user to communicate, via the cellular phone 100, with the far-end user.

The cellular phone 100 includes an antenna 102, a radio transceiver 104, an analog baseband module 106, a digital baseband module 108, a power management unit (PMU) 110, and a battery 112. The antenna 102 captures a received voice or data communication from the one or more fixed location transceivers and/or provides a transmitted voice or data communication from the radio transceiver 104 to the one or more fixed location transceivers.

The radio transceiver 104 may include one or more amplifiers, such as one or more low noise amplifiers (LNAs) and/or one or more low noise block converters (LNBs) to provide some examples, to amplify the received voice or data communication after it has been captured by the antenna 102 and/or to amplify the transmitted voice or data communication prior to being provided to the one or more fixed location transceivers. The radio transceiver 104 may additionally include one or more filters to filter the received voice or data communication and/or the transmitted voice or data communication, respectively. The radio transceiver 104 may further include one or more mixers to downconvert the received voice or data communication after it has been captured by the antenna 102 and/or to upconvert the transmitted voice or data communication prior to being provided to the one or more fixed location transceivers. The radio transceiver 104 may yet further include a diplexer or switch to separate the received voice or data communication captured from the one or more fixed location transceivers and the transmitted voice or data communication to be provided to the one or more fixed location transceivers.

The analog baseband module 106 performs typical analog signal processing upon the received voice or data communication and/or the transmitted voice or data communication. For example, the analog baseband module 106 may include a channel encoder to encode the transmitted voice or data communication and/or a channel decoder to decode the received voice or data communication according to one or more linear block codes and/or one or more convolutional codes. The analog baseband module 106 may additionally include one or more multiplexers to multiplex a voice communication received from a microphone 122 with a data communication received from the digital baseband processing module 108 and/or one or more demultiplexers to separate the received voice or data communication to provide a voice communication to a speaker 124 and a data communication to the digital baseband processing module 108. The analog baseband module 106 may further include one or more speech encoders to encode the voice communication received from the microphone 122 and/or one or more speech decoders to decode the voice communication provided to the speaker 124. The analog baseband module 106 may yet further include one or more analog to digital converters to convert the data communication to be provided to the digital baseband processing module 108 to a digital representation and/or one or more digital to analog converters to convert the data communication from the digital baseband processing module 108 to an analog representation.

The digital baseband processing module 108 performs typical digital signal processing upon the data communication provided by the analog baseband module 106 and/or the data communication to be provided to the analog baseband module 106. The digital baseband processing module 108 may include one or more processors to load one or more software applications from the flash/SRAM 118. The one or more software applications may operate upon the data communication provided by the analog baseband module 106 to provide a graphical output to a display 116. A keypad 114 may provide a numerical input, such as a telephone number of the far-end user, a text message for a Short Message Service (SMS) application, an electronic mail message destined for the near-end user, or any other suitable application to be performed by the near-end user to provide some examples, to the digital baseband processing module 108. The one or more software applications may operate on this numerical input to provide the data communication for the analog baseband module 106. The one or more software applications, such as electronic games to provide an example, may operate upon the numerical input from the keypad 114 to provide the graphical output to the display 116 and/or voice data for the analog baseband module 106 for the speaker 124. The digital baseband processing module 108 may further store the numerical input from the keypad 114, the graphical output to the display 116, and/or the data communication provided by the analog baseband module 106 into the flash/SRAM 118.

The PMU 110 is responsible for monitoring power connections and battery charges, charging batteries when necessary, and controlling power to other integrated circuits, as well other power functions of the cellular phone. For example, the PMU 110 converts a first voltage received from a battery 112, and/or any other suitable source, to one or more second voltages to be used by the cellular phone 100. The PMU may additionally include one or more battery chargers to charge the battery 112 from an external alternating current (AC) and/or direct current (DC) source. The PMU may further communicate a status of the battery 112 to the digital baseband processing module 108.

The battery 112 may include one or more nickel-cadmium (NiCd), one or more nickel metal hydride (NiMH), and/or one or more lithium-ion (Li-ion) cells. However, this example is not limiting, those skilled in the relevant art(s) may implement the battery 112 using other battery chemistries without departing from the scope and spirit of the present invention. The one or more cells of the battery 112 convert chemical energy into electrical energy via an electrochemical reaction.

One or more components of the cellular phone 100, such as, but not limited to, the radio transceiver 104, the analog baseband module 106, the digital baseband module 108, and/or the PMU 110 to provide some examples, may be implemented on a semiconductor chip or die. For example, the digital baseband module 108 and the PMU 110 may be implemented on a semiconductor chip or die. Alternatively, the one or more components of the cellular phone 100 may be each implemented on a single chip or die. For example, the radio transceiver 104, the analog baseband module 106, the digital baseband module 108, and/or the PMU 110 may each be implemented on a single chip or die.

Figure 2:
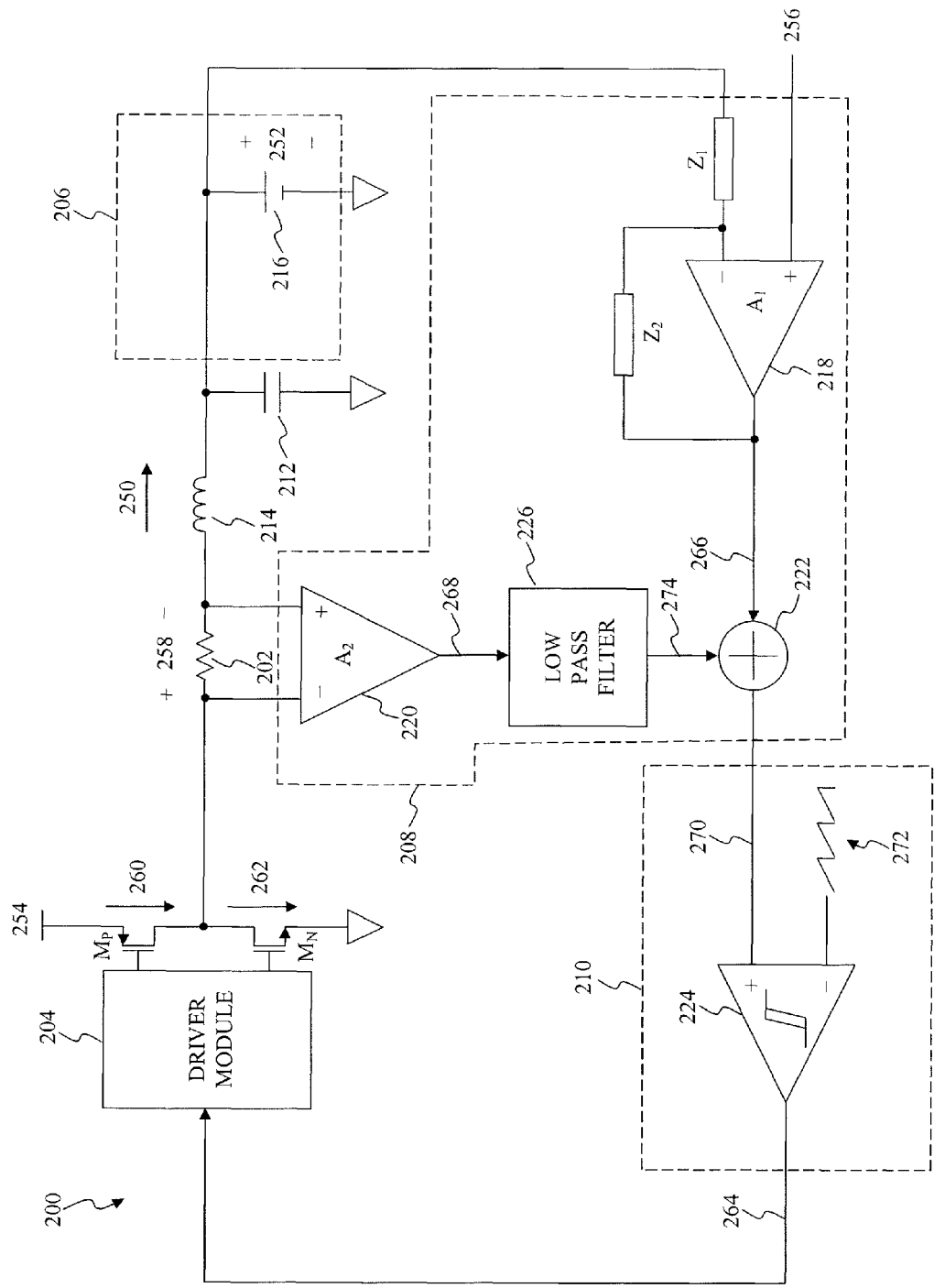
FIG. 2 illustrates a conventional switching charger module used in a conventional power management unit.

Conventional Switching Charger Module Module Implemented within a Power Management Unit (PMU) for a Cellular Phone FIG. 2 illustrates a conventional switching charger module used in a conventional power management unit. The PMU 110 may include a conventional switching charger module 200 to provide an output power including an output current 250 and/or an output voltage 252 based upon an input voltage 254 to restore or recharge a battery such as the battery 112 to provide an example. The conventional switching charger module 200 regulates an input voltage 254 from an external alternating current (AC) and/or direct current (DC) source such that the output voltage 252 closely approximates a reference voltage 256. More specifically, the conventional switching charger module 200 compares the output voltage 252 to the references voltage to provide an error voltage 266. The conventional switching charger module 200 measures the output current 250 using a sensing resistor 202. The conventional switching charger module 200 then compares a sensing voltage 258 across the sensing resistor 202 to the error voltage 266 to determine whether an adjustment needs to be made to the output voltage 252 such that the output voltage 252 more closely approximates the reference voltage 256.

The conventional switching charger module 200 includes a driver module 204, a load 206, a current sensing module 208, and a pulse width modulator (PWM) 210. The driver module 204 switches between sourcing a charging current 260 to the output current 250 and/or sinking a discharging current 262 from the output current 250 to adjust the output voltage 252 to approximate the reference voltage 256. More specifically, the driver module 204 causes a charging transistor $M_P$ to source the charging current 260 to the output capacitor 212 via an output inductor 214 based upon a PWM control signal 264. The charging current 260 causes a power stored by the output capacitor 212, namely the output current 250 and/or the output voltage 252, to increase. Alternatively, the driver module 204 causes a discharging transistor $M_N$ to sink the discharging current 262 from the output capacitor 212 via the output inductor 214, based upon the PWM control signal 264. The discharging current 262 causes the power stored by the output capacitor 212 to decrease. The driver module 204 may cause the charging transistor $M_P$ to source the charging current 260 when the PWM control signal 264 is at a logical zero and the discharging transistor $M_N$ to sink the discharging current 262 when the PWM control signal 264 is at a logical one to provide an example.

The conventional switching charger module 200 provides the output current 250 to the load 206 to restore or recharge a battery 216. The battery 216 may represent an exemplary embodiment of the battery 112 and may include one or more nickel-cadmium (NiCd), one or more nickel metal hydride (NiMH), and/or one or more lithium-ion (Li-ion) cells. However, this example is not limiting, those skilled in the relevant art(s) may implement the battery 106 using other battery chemistries without departing from the scope and spirit of the present invention. The one or more cells of the battery 106 convert chemical energy into electrical energy via an electrochemical reaction. The battery charging current 154 may reverse the electrochemical reaction allowing the battery 106 to be restored or recharged by the output current 250.

The current sensing module 208 compares the sensing voltage 258 and the reference voltage 256 to provide an adjustment control signal 270. The current sensing module 208 includes a reference amplifier 218, a sensing amplifier 220, a combination module 222, and a low pass filter 226. The reference amplifier 218 is coupled to a first impedance $Z_1$, the first impedance $Z_1$ having a first terminal connected to an inverting input of the reference amplifier 218 and a second terminal to receive the output voltage 252. The reference amplifier 218 additionally includes a second impedance $Z_2$ coupled between the inverting input and an output of the reference amplifier 218. The reference amplifier 218 further includes a non-inverting input to receive the reference voltage 256. The reference amplifier 218 provides an error voltage 266 that is proportional to a difference between the output voltage 252 and the reference voltage 256. The reference amplifier 218 may additionally scale the error voltage 266 by a first gain $A_1$. The sensing amplifier 220 compares a difference in voltage between a first terminal of the sensing resistor 202 and a second terminal of the sensing resistor 202 to provide a sensing voltage 268. The sensing amplifier 220 may additionally scale the sensing voltage 268 by a second gain $A_2$. The low pass filter 226 extracts a direct current (DC) component from the sensing voltage 268 to provide a DC sensing voltage 274, the DC sensing voltage being proportional to the charging current 250. The summation module 214 combines the error voltage 266 and the DC sensing voltage 274 to provide the adjustment control signal 270.

The PWM 210 compares the adjustment control signal 270 to a reference pulse 272, such as a saw tooth pulse to provide an example, to provide the PWM control signal 264. The PWM 210 includes a comparator 224. The comparator 224 compares the adjustment control signal 270 to a reference pulse 272, such as a saw tooth pulse to provide an example, to provide the PWM control signal 264. The comparator 224 provides a logical zero as the PWM control signal 264 when the adjustment control signal 270 is less than the reference pulse 272. Alternatively, the comparator 224 provides a logical one as the PWM control signal 264 when the adjustment control signal 270 is greater than or equal to the reference pulse 272.

Figure 3:
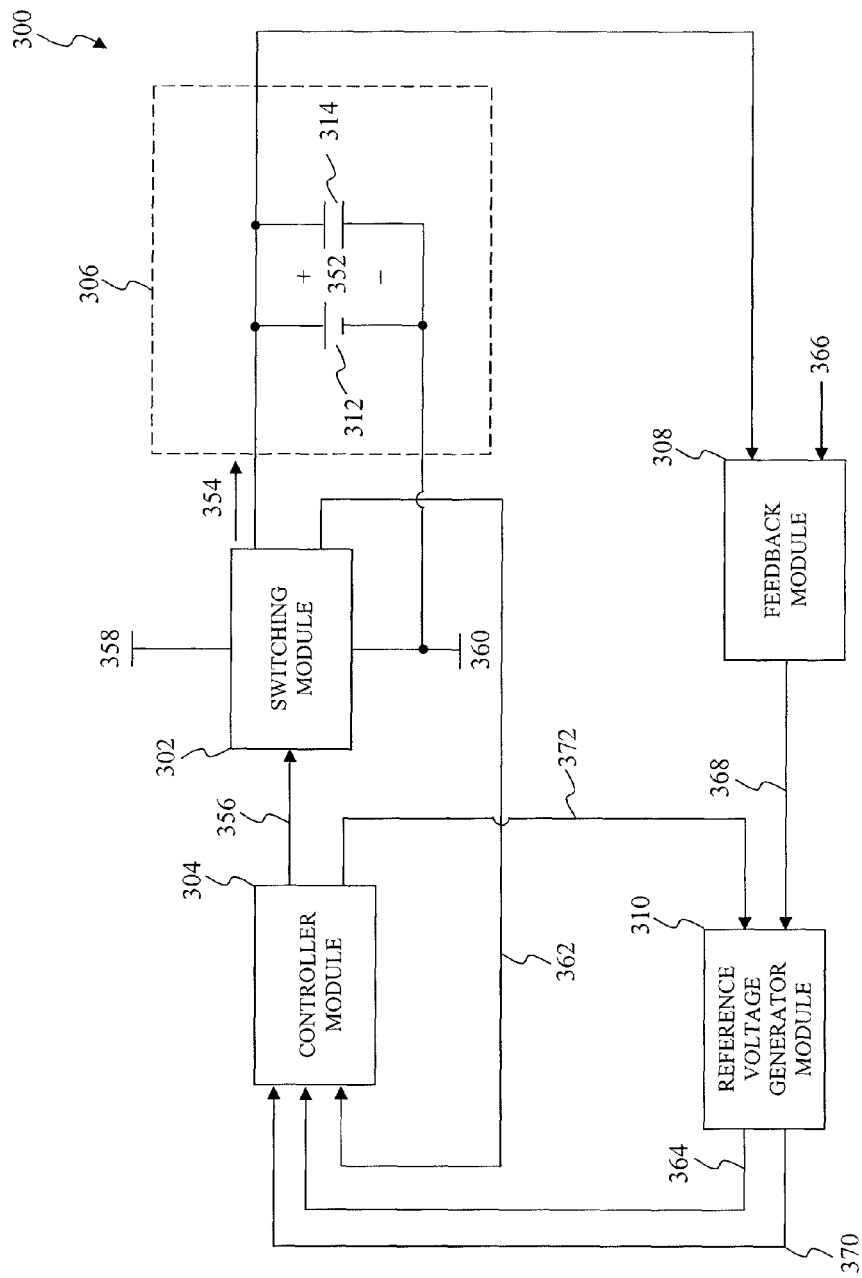
FIG. 3 illustrates a functional block diagram of a first switching charger module used in the power management unit according to a first exemplary embodiment of the present invention.

First Switching Charger Module Implemented Within the PMU for the Cellular Phone According to a First Exemplary Embodiment of the Present Invention FIG. 3 illustrates a functional block diagram of a first switching charger module used in the power management unit according to a first exemplary embodiment of the present invention. The PMU 110 may include a switching charger module 300 to restore or recharge one or more cells of a battery, such as the battery 112 to provide an example, using a charging current 354. The one or more cells of the battery convert chemical energy into electrical energy via an electrochemical reaction. The charging current 354 may reverse the electrochemical reaction by converting electrical energy back into chemical energy, thereby allowing the battery to be restored or recharged.

Figure 15:
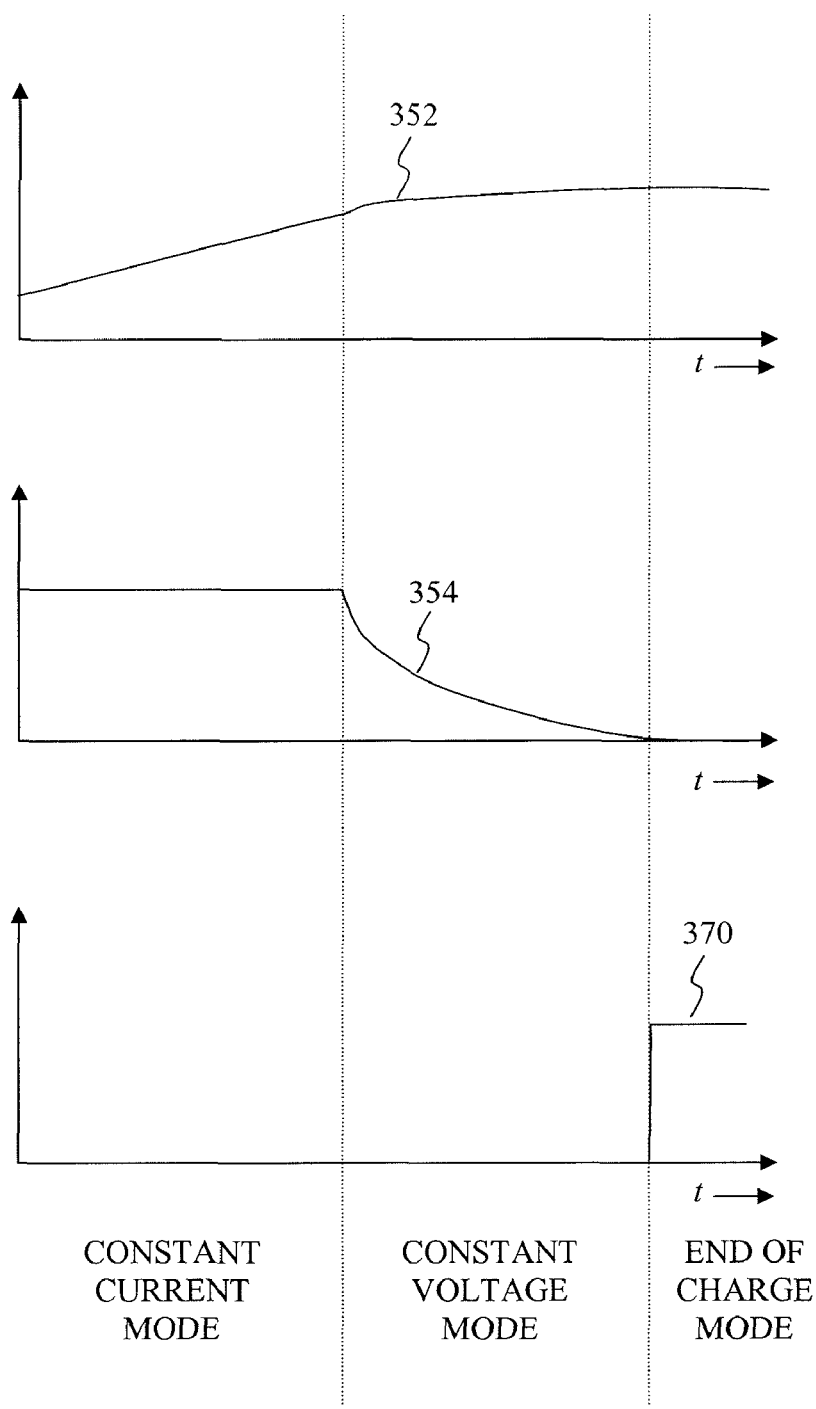
FIG. 15 illustrates modes of operation of the first switching charger module according to an exemplary embodiment of the present invention.

The switching charger module 300 may operate in a constant current mode of operation, a constant voltage mode of operation, or an end of charge mode of operation. FIG. 15 illustrates modes of operation of the first switching charger module according to an exemplary embodiment of the present invention. In the constant current mode of operation, the switching charger module 300 provides a charging current 354 characterized as having a constant average magnitude to the battery causing an output voltage 352 to increase, the output voltage 352 representing a voltage of the battery, namely a magnitude of the stored charge in the battery. The switching charger module 300 operates in the constant current mode of operation until the output voltage 352 approximates a reference voltage 366, whereby the switching charger module 300 begins to operate in the constant voltage mode of operation. In the constant voltage mode of operation, the switching charger module 300 decreases the average magnitude of the charging current 354 such that the output voltage 352 remains substantially constant. The switching charger module 300 decreases the charging current 354 until the average magnitude of the charging current 354 is less than a threshold, whereby the switching charger module 300 enters into the end of charge mode of operation. In the end of charge mode of operation, the battery is completely restored or charged, namely the chemical energy of the battery has been sufficiently restored or recharged. In this mode of operation, the switching charger module 300 provides an end of charge indicator 370 to disable the charging current 354 such that the battery is no longer being charged.

The switching module 300 includes a switching module 302, a controller module 304, a load module 306, a feedback module 308, and a reference voltage generator module 310. The switching module 302 sources and/or sinks the charging current 354 in response to a charging control signal 356. More specifically, the switching module 302 continuously switches between a first input voltage 358, such as the input power 112 from an external alternating current (AC) and/or direct current (DC) source to provide some examples, and a second input voltage 360, such as a ground potential to provide an example, in response to the charging control signal 356. The switching module 302 may source the charging current 354 from the first input voltage 358 when the charging control signal 356 is at a logical zero. Alternatively, the switching module 302 may sink the charging current 354 to the second input voltage 360 when the charging control signal 356 is at a logical one. The switching module 300 may additionally provide a sensing voltage 362 to the controller module 304, the sensing voltage 362 being proportional to the charging current 354.

The controller module 304 provides the charging control signal 356 based upon a reference voltage 364, the reference voltage 364 being proportional to a duty-cycle of the switching module 300 under a slow dynamics. More specifically, in the constant current more of operation and/or the constant voltage mode of operation, the controller module 304 compares the reference voltage 364 to a control voltage pulse. The controller module 304 provides a logical zero as the charging control signal 356 when the control voltage pulse is greater than the reference voltage 364. Alternatively, the controller module 304 provides a logical one as the charging control signal 356 when the control voltage pulse is less than or equal to than the reference voltage 364. However, in the end of charge mode of operation, the end of charge indicator 370 indicates the battery is fully charged. For example, a logical one as the end of charge indicator 370 indicates the battery is completely restored or charged. In this mode of operation, the controller module 304 provides a charging control signal 356 that disables the switching module 302 such that the switching module 302 no longer provides the charging current 354. The controller module 304 may additionally provide a zero current indicator 372 to indicate that the charging current 354 is less than a threshold. The controller module 304 provides a logical one as the zero current indicator 372 when the sensing voltage 362 is greater than or equal to the threshold, the sensing voltage 362 being proportional to a part of the charging current 354. Alternatively, the controller module 304 provides a logical zero as the zero current indicator 372 when the sensing voltage 362 is less than the threshold.

The switching module 300 sources the charging current 354 to the load module 306 when the charging control signal 356 is at a logical zero. Alternatively, the switching module 300 sinks the charging current 354 from the load module 306 when the charging control signal 356 is at a logical one. The load module 306 includes a battery 312 and an output capacitor 314. However, this example, is not limiting, those skilled in the relevant art(s) will recognize the load module 306 may include any suitable combination of passive elements such as resistors, inductors, and/or capacitors. The output voltage 352 and/or charging current 354 may restore or recharge the battery 312. The battery 312 may represent an exemplary embodiment of the battery 112 and may include one or more nickel-cadmium (NiCd), one or more nickel metal hydride (NiMH), and/or one or more lithium-ion (Li-ion) cells. However, this example is not limiting, those skilled in the relevant art(s) may implement the battery 312 using other battery chemistries without departing from the scope and spirit of the present invention. The one or more cells of the battery 312 convert chemical energy into electrical energy via an electrochemical reaction. The charging current 354 may reverse the electrochemical reaction allowing the battery 106 to be restored or recharged. The optional output capacitor 314 is used as a safety mechanism for the switching module 300 when the battery 312 is removed.

The feedback module 308 compares the output voltage 352 and the reference voltage 366 to provide a charging error signal 368. More specifically, the charging error signal 368 represents a difference between the output voltage 352 and the reference voltage 366.

The reference voltage generator module 310 provides the reference voltage 364 based upon the charging error signal 368. More specifically, the reference voltage generator module 310 provides the reference voltage 364 when operating in the constant current mode of operation. Alternatively, the reference voltage generator module 310 scales the reference voltage 364 and provides this scaled constant reference current as the reference voltage 364 when operating in the constant voltage mode of operation. The reference voltage generator module 310 may additionally provide the end of charge indicator 370 based upon the zero current indicator 372. The reference voltage generator module 310 provides a logical zero as the end of charge indicator 370 when the reference voltage 364 is above a threshold value indicating that the switching switcher 300 is to operate in either the constant current mode of operation or the constant voltage mode of operation. Alternatively, the controller module 304 provides a logical one as the end of charge indicator 370 when the zero current indicator 372 is a logical one and the reference voltage 364 is below the threshold value indicating that the switching switcher 300 is to operate in the end of charge mode of operation.

Figure 4:
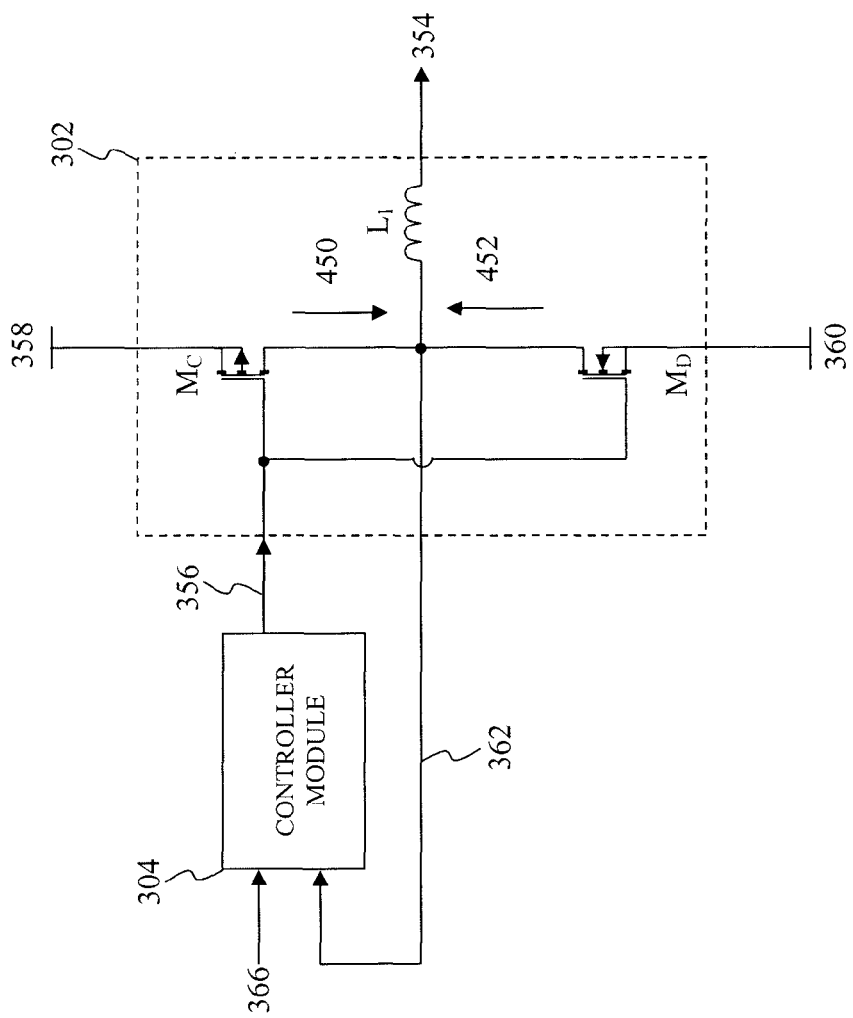
FIG. 4 illustrates a schematic block diagram of a switching module used in the first switching charger module according to an exemplary embodiment of the present invention.

Switching Module Used in the First Switching Charger Module According to an Exemplary Embodiment of the Present Invention FIG. 4 illustrates a schematic block diagram of a switching module used in the first switching charger module according to an exemplary embodiment of the present invention. The switching module 302 continuously switches between the first input voltage 358 and the second input voltage 360 to source or to sink the charging current 354 in response to the charging control signal 356.

The switching module 302 includes a charging transistor $M_C$, a discharging transistor $M_D$, and an optional inductor $L_1$. The charging transistor $M_C$ sources an element charging current 450 from the first input voltage 358 in response to the charging control signal 356. In an exemplary embodiment, the charging transistor $M_C$ is implemented using a p-type metal oxide silicon (PMOS) transistor. In this exemplary embodiment, the charging transistor $M_C$ sources the element charging current 450 when the charging control signal 356 is at a logical zero.

The discharging transistor $M_D$ sinks an element discharging current 452 from the charging current 354 in response to the charging control signal 356. In an exemplary embodiment, the discharging transistor $M_D$ is implemented using an n-type metal oxide silicon (NMOS) transistor. In this exemplary embodiment, the discharging transistor $M_D$ sinks the element discharging current 452 when the charging control signal 356 is at a logical one. In another exemplary embodiment, the element discharging current 452 may be additionally provided to the controller module 304 as the sensing voltage 362, the sensing voltage being proportional to the element discharging current 452.

The element charging current 450 and the element discharging current 452 may be combined to provide the charging current 354 via the optional inductor $L_1$. Alternatively, the element charging current 450 and the element discharging current 452 may be directly combined to provide the charging current 354.

Figure 5:
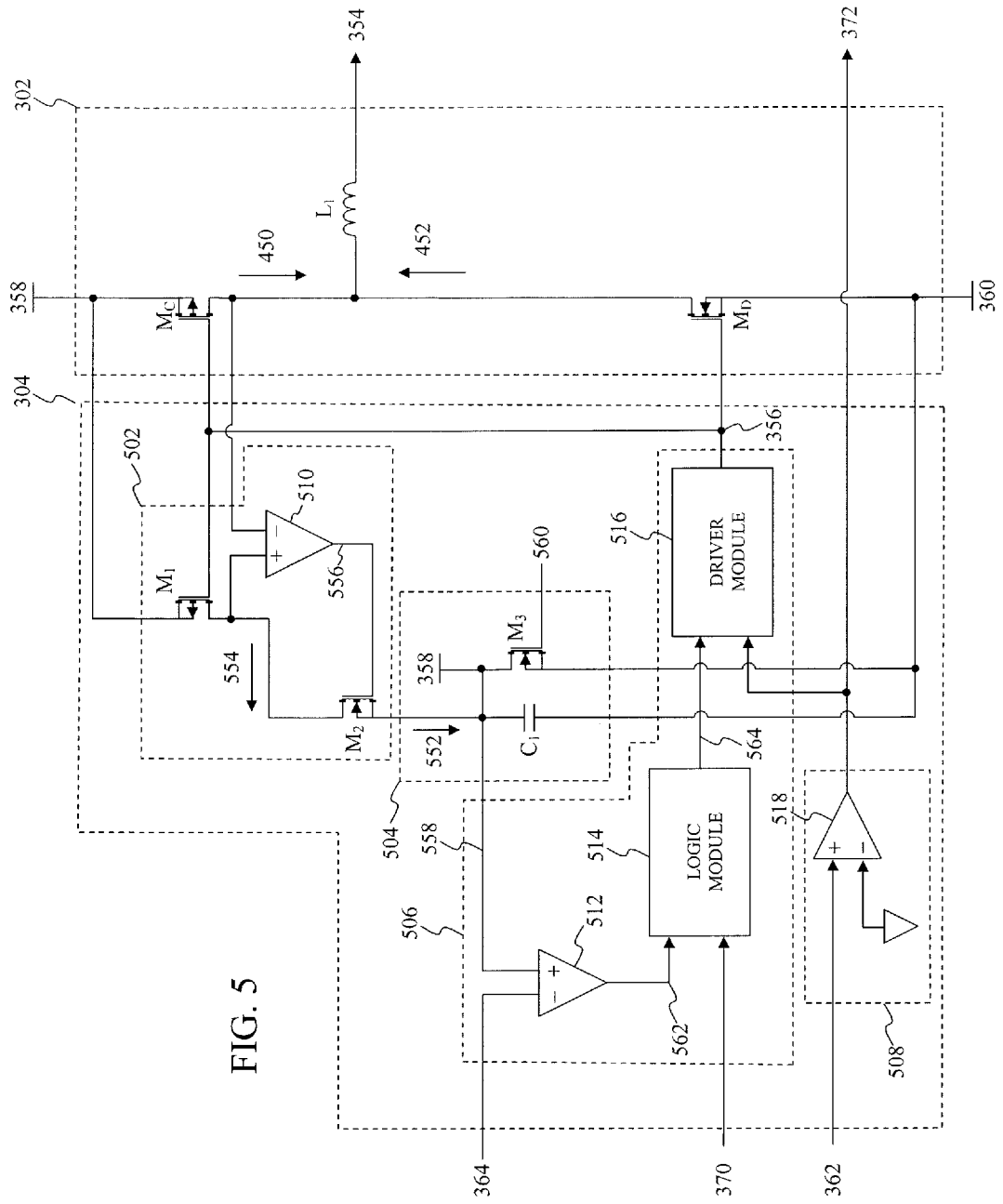
FIG. 5 illustrates a schematic block diagram of a first controller module used in the first switching charger module according to a first exemplary embodiment of the present invention.

First Controller Module Used in the First Switching Charger Module According to a First Exemplary Embodiment of the Present Invention FIG. 5 illustrates a schematic block diagram of a first controller module used in the first switching charger module according to a first exemplary embodiment of the present invention. The controller module 304 provides the charging control signal 356 to the switching module 300 based upon a comparison of the reference voltage 364 and a control voltage pulse 558. The controller module 304 may additionally provide a zero current indicator 372 to indicate that the charging current 354 is less than a threshold.

The controller module 304 includes a current replica module 502, a control voltage pulse module 504, a reference voltage module 506, and a charge disable module 508. The current replica module 502 observes or senses the element charging current 450 to provide a replica current 552. The current replica module 502 includes a scaling transistor $M_1$, a sensing transistor $M_2$, and a comparator 510. The scaling transistor $M_1$ sources a scaled charging current 554 from the first input voltage 358 in response to the charging control signal 356. In an exemplary embodiment, the scaling transistor $M_1$ is implemented using a p-type metal oxide silicon (PMOS) transistor. In this exemplary embodiment, the scaling transistor $M_1$ provides the scaled charging current 554 when the charging control signal 356 is at a logical zero. In another exemplary embodiment, the scaling transistor $M_1$ is implemented having a width that is N times as smaller as a width of the charging transistor $M_C$. In this embodiment, the element charging current 450 flowing through the scaling transistor $M_1$ is proportional to the element charging current 450 by a first scaling factor of 1/N such that:

$$I_{P,S} = \frac{I_P}{N}, \tag{1}$$

where $I_{P,S}$ represents the scaled charging current 554 and $I_P$ represents the element charging current 450. The peak value of the control voltage pulse 558 may be represented as, assuming continuous conduction mode of operation, $$V_{C,pk} = \frac{D \langle I_{OUT} \rangle T_S}{NC_1} \tag{2}$$

where $T_S$ represents the switching period and D represents the duty-cycle of the switching module 300. The operator $\langle \rangle$ denotes an average value of its argument. The duty-cycle D represents the ratio of the on-time of the charging transistor $M_C$ and the switching period $T_S$. The duty-cycle D is determined by the comparison of the reference voltage 364 and the control voltage pulse 558.

The comparator 510 replicates a voltage drop across the charging transistor $M_C$. More specifically, the comparator 510 compares a drain voltage of the scaling transistor $M_1$ and a drain voltage of the charging transistor $M_C$ to provide a sensing control signal 556. The comparator 510 provides a logical one as the sensing control signal 556 when the drain voltage of the scaling transistor $M_1$ is greater than or equal to the drain voltage of the charging transistor $M_C$. Alternatively, the comparator 510 provides a logical zero as the sensing control signal 556 when the drain voltage of the scaling transistor $M_1$ is less than the drain voltage of the charging transistor $M_C$. The sensing transistor $M_2$ modulates the scaled charging current 554 based upon the sensing control signal 556 to provide the replica current 552, the replica current 552 being proportional to the element charging current 450 by the first scaling factor. In an exemplary embodiment, the sensing transistor $M_2$ is implemented using an n-type metal oxide silicon (NMOS) transistor. In this exemplary embodiment, the sensing transistor $M_2$ provides the replica current 552 when the current control signal 356 is at a logical zero.

The control voltage pulse module 504 provides the control voltage pulse 558 based upon the replica current 552. The control voltage pulse module 504 includes a modulating transistor $M_3$ and a capacitor $C_1$. The replica current 552 charges and/or discharges the capacitor $C_1$ in response to a clocking signal 560 to provide the control voltage pulse 558. More specifically, the modulating transistor $M_3$ causes the replica current 552 to charge the capacitor $C_1$ when the clocking signal 560 is at a logical zero and the charging control signal 356 is at a logical zero. Alternatively, the modulating transistor $M_3$ causes the capacitor $C_1$ to discharge when the clocking signal 560 is at a logical one. In an exemplary embodiment, the charging and/or discharging of the capacitor $C_1$ in this manner generates a saw tooth pulse as the control voltage pulse 558.

The reference voltage module 506 provides the charging control signal 356 based upon a comparison of the reference voltage 364 and the control voltage pulse 558. The reference voltage module 506 includes a comparator 512, a logic module 514, and a driver module 516. The comparator 512 compares the reference voltage 364 and the control voltage pulse 558 to provide a charge error control signal 562. More specifically, the comparator 512 provides a logical zero as the charge error control signal 562 when the reference voltage 364 is greater than or equal to the control voltage pulse 558. Alternatively, the comparator 512 provides a logical one as the charge error control signal 562 when the reference voltage 364 is less than or equal to the control voltage pulse 558.

The logic module 514 provides a charge error control signal 564 in response to the charge error control signal 562. More specifically, the logic module 514 decreases a duty cycle of the charge error control signal 564 to terminate switching of the switching module 302 when the end of charge indicator 370 is a logical one. Alternatively, the logic module 514 provides a duty cycle of the charge error control signal 562 when the end of charge indicator 370 is a logical zero, the duty cycle of the charge error control signal 562 being non-zero.

The driver module 516 provides the charging control signal 356 in response to the charge error control signal 564. The driver module 516 adjusts a power level of the charge error control signal 564 to ensure that the charging control signal 356 adequately drives the switching module 302 when the zero current indicator 372 is a logical zero. Alternatively, the driver module 516 provides the charging control signal 356 to disable the switching module 302 when the zero current indicator 372 is a logical one.

The charge disable module 508 compares the sensing voltage 362 with the threshold, such as the second input voltage 360 to provide an example, to provide the zero current indicator 372, the zero current indicator 372 indicating that the charging current 354 is less than the second input voltage 360. The charge disable module 508 includes a comparator 518. The comparator 518 compares the sensing voltage 362 with the second input voltage 360. The comparator 518 provides a logical one as the zero current indicator 372 when the sensing voltage 362 is greater than or equal to the second input voltage 360. Alternatively, the comparator 518 provides a logical zero as the zero current indicator 372 when the sensing voltage 362 is less than the second input voltage 360.

Figure 6:
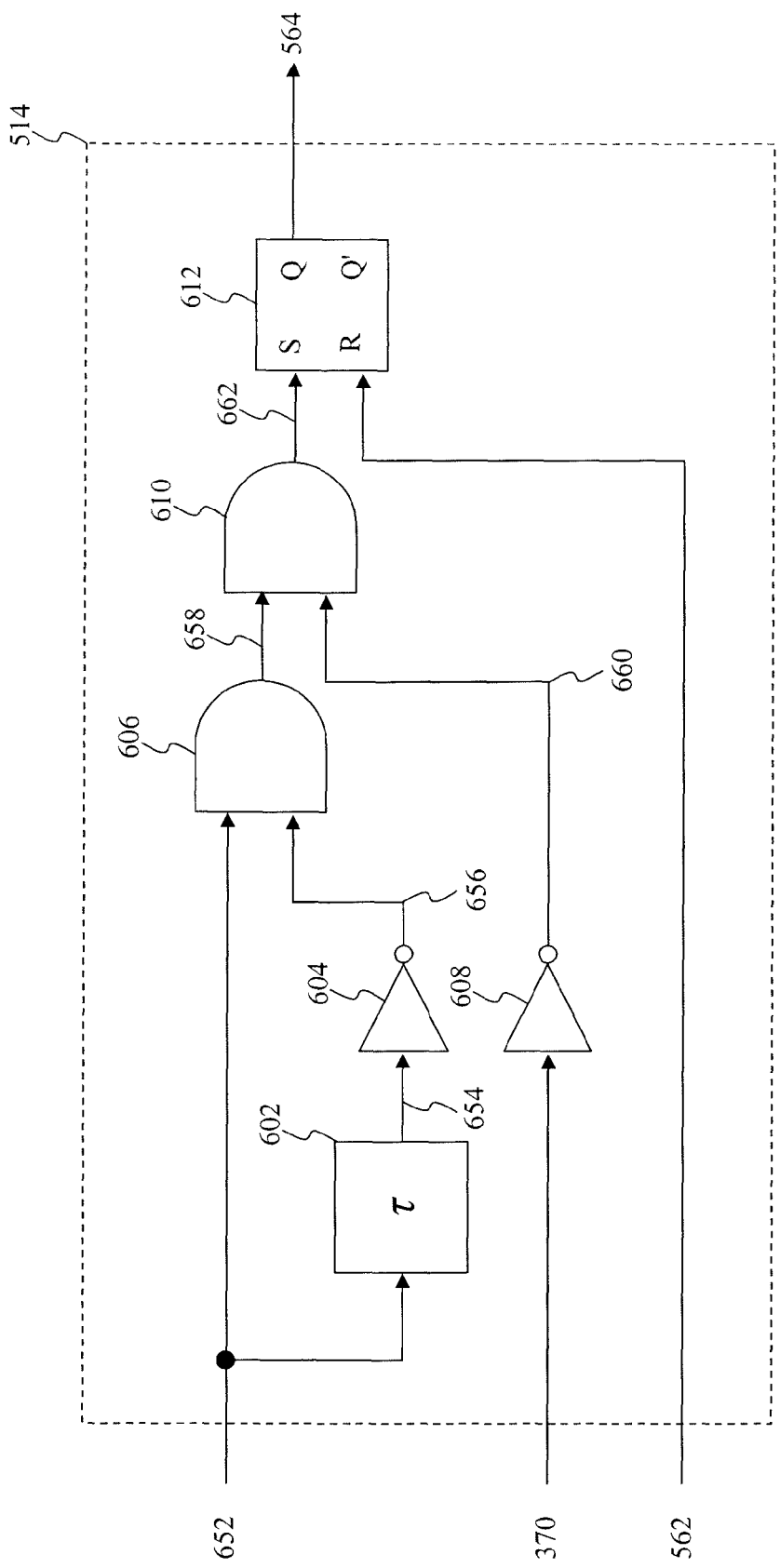
FIG. 6 illustrates a schematic block diagram of a logic module used in the controller module according to an exemplary embodiment of the present invention.

Logic Module Used in the First Controller Module According to an Exemplary Embodiment of the Present Invention FIG. 6 illustrates a schematic block diagram of a logic module used in the controller module according to an exemplary embodiment of the present invention. The logic module 514 switches between a logical zero and a logical one using a clock in response to the charge error control signal 562 to provide a charge error control signal 564 when the end of charge indicator 370 is a logical zero. Alternatively, the logic module 514 continuously provides a logical zero as the charge error control signal 564 to indicate the battery is fully charged when the end of charge indicator 370 is a logical one.

The logic module 514 includes a delay module 602, a first logical inverting gate 604, a first logical AND gate 606, a second logical inverting gate 608, a second logical AND gate 610, and a latching module 612. The delay module 602 delays the clocking signal 652 having a frequency of $f_1$ by a fixed delay $\tau$ to provide a delayed clocking signal 654, the fixed delay $\tau$ being less than $$\frac{1}{f_1}.$$

The first logical inverting gate 604 inverts the delayed clocking signal 654 to provide an inverted delayed clocking signal 656. The first logical AND gate 606 performs a first logical AND function upon the clocking signal 652 and the inverted delayed clocking signal 656 to provide a reduced-duty cycle clocking signal 658 when the clocking signal 652 and the inverted delayed clocking signal 656 are both at logical ones. The reduced-duty cycle clocking signal 658 may be characterized as having a duty cycle that is approximately equal to the fixed delay $\tau$.

The second logical inverting gate 608 inverts the end of charge indicator 370 to provide an inverted end of charge indicator 660. The second logical AND gate 610 performs a second logical AND function upon the reduced-duty cycle clocking signal 658 and the inverted end of charge indicator 660 to provide a charging clocking signal 662 when the reduced-duty cycle clocking signal 658 and the inverted end of charge indicator 660 are both at logical ones.

The latching module 612 provides the charge error control signal 564 having one of two possible states, such as a logical zero and a logical one to provide an example, based up the charge error control signal 562 and the charging clocking signal 662. In an exemplary embodiment, the latching module 612 is implemented using a well known set-rest latch. In this exemplary embodiment, the latching module 612 provides a logical zero as the charge error control signal 564 when the charging clocking signal 662 is at a logical zero and the charge error control signal 562 is at a logical one. The latching module 612 may also provide a logical one as the charge error control signal 564 when the charging clocking signal 662 is at a logical one and the charge error control signal 562 is at a logical zero. The latching module 612 may additionally provide a previous value of the charge error control signal 564 as the charge error control signal 564 when both the charging clocking signal 662 and the charge error control signal 562 are at logical zeros.

Figure 7:
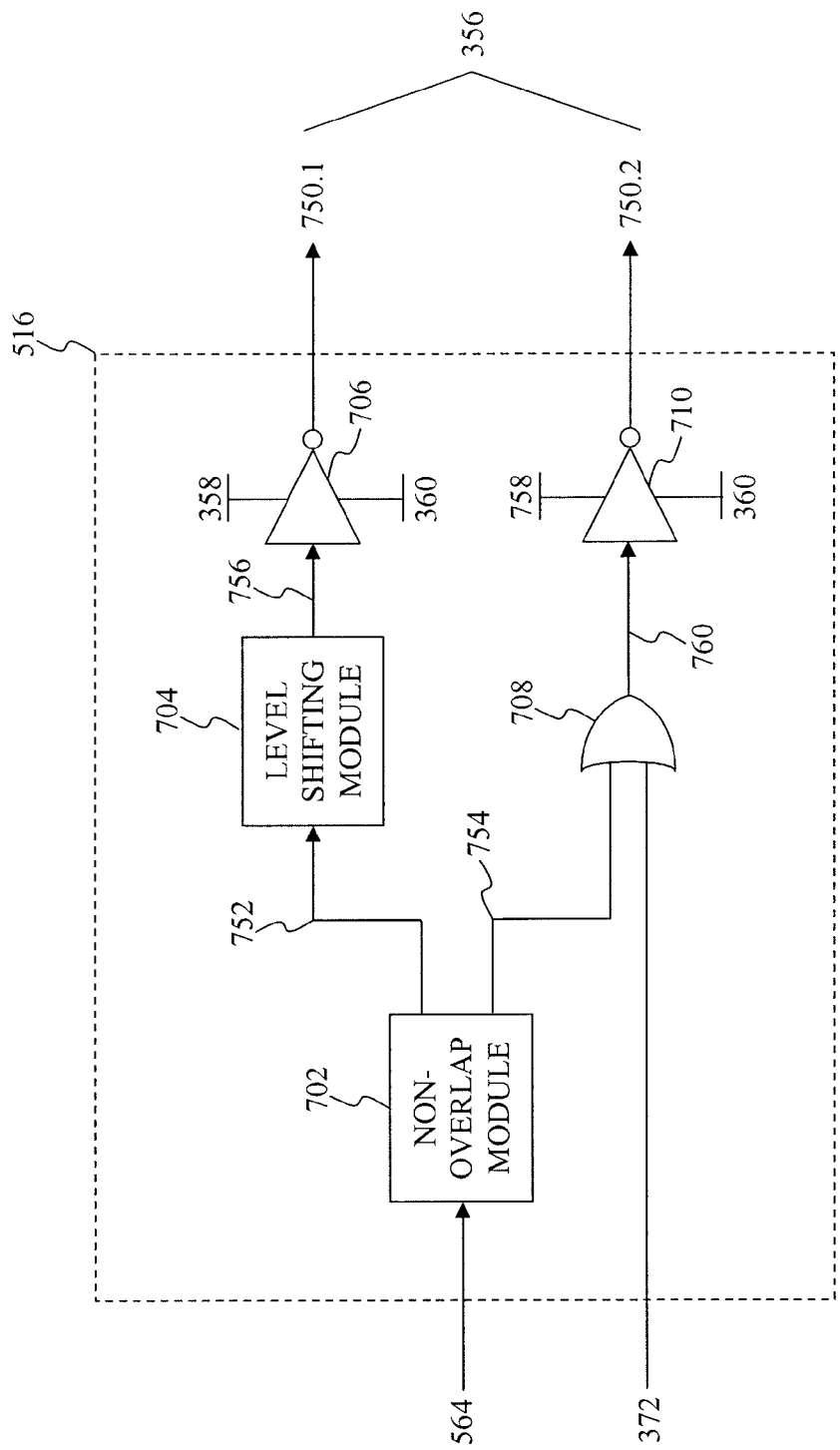
FIG. 7 illustrates a schematic block diagram of a driver module used in the controller module according to an exemplary embodiment of the present invention.

Driver Module Used in the First Controller Module According to an Exemplary Embodiment of the Present Invention FIG. 7 illustrates a schematic block diagram of a driver module used in the controller module according to an exemplary embodiment of the present invention. The driver module 516 provides a charging control signal 750.1 at a logical zero when the charge error control signal 564 is at a logical one. Alternatively, the driver module 516 provides a discharging control signal 750.2 at a logical one when the charge error control signal 564 is at a logical zero. In this exemplary embodiment, the charging control signal 356 includes the charging control signal 750.1 and the discharging control signal 750.2, the charging control signal 750.1 and discharging control signal 750.2 being provide to the charging transistor $M_C$ and the discharging transistor $M_D$, respectively.

The driver module 516 includes a non-overlap module 702, a level shifting module 704, a first logical inverting gate 706, a logical OR gate 708, and a second logical inverting gate 710. The non-overlap module 702 separates the charge error control signal 564 into a first charge error control signal 752 and a second charge error control signal 754. The non-overlap module 702 ensures that the first charge error control signal 752 and the second charge error control signal 754 are substantially synchronous having no substantial overlap such that the first charge error control signal 752 and the second charge error control signal 754 transition between logical values at a substantially similar instance in time.

The level shifting module 704 shifts a voltage level of the first charge error control signal 752 to provide a charging control signal 756. More specifically, the level shifting module 704 shifts the first charge error control signal 752 by a difference between the first input voltage 358 and an intermediate voltage 758, the intermediate voltage 758 representing an operating voltage of the switching charger module 300, commonly denoted as $V_{DD}$.

The first logical inverting gate 706 inverts the charging control signal 756 to provide the charging control signal 750.1. More specifically, the first logical inverting gate 706 provides the first input voltage 358 as the charging control signal 750.1 when the charging control signal 756 is a logical zero. Alternatively, the first logical inverting gate 706 provides the second input voltage 360 as the charging control signal 750.1 when the charging control signal 756 is a logical one.

The logical OR gate 708 performs a logical OR function upon the second charge error control signal 754 and the zero current indicator 372 to provide a discharging control signal 760. More specifically, the logical OR gate 708 provides a logical one as the discharging control signal 760 when either one of the second charge error control signal 754 or the zero current indicator 372 are logical ones. Alternatively, the logical OR gate 708 provides a logical zero as the discharging control signal 760 when both of the second charge error control signal 754 and the zero current indicator 372 are logical zeros.

The second logical inverting gate 710 inverts the discharging control signal 760 to provide the discharging control signal 750.2. More specifically, the second logical inverting gate 710 provides the intermediate voltage 758 as the discharging control signal 750.2 when the discharging control signal 760 a logical zero. Alternatively, the second logical inverting gate 710 provides the second input voltage 360 as the discharging control signal 750.2 when the discharging control signal 760 is a logical one.

Figure 8:
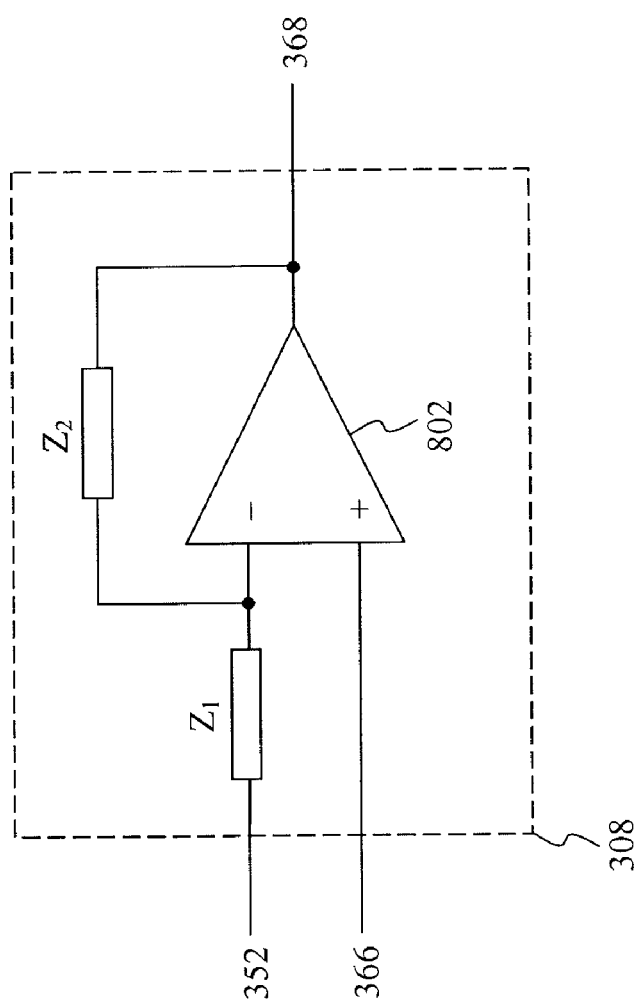
FIG. 8 illustrates a schematic block diagram of a feedback module used in the switching charger module according to an exemplary embodiment of the present invention.

Feedback Module Used in the First Switching Charger Module According to an Exemplary Embodiment of the Present Invention FIG. 8 illustrates a schematic block diagram of a feedback module used in the switching charger module according to an exemplary embodiment of the present invention. The feedback module 308 compares the output voltage 352 and the reference voltage 366 to provide a charging error signal 368, the charging error signal 368 indicating a difference between the output voltage 352 and the reference voltage 366.

The feedback module 308 includes a feedback amplifier 802. The feedback amplifier 802 is coupled to a first impedance $Z_1$, the first impedance $Z_1$ having a first terminal connected to an inverting input of the feedback amplifier 802 and a second terminal to receive the output voltage 352. The feedback amplifier 802 additionally includes a second impedance $Z_2$ coupled between the inverting input and an output of the feedback amplifier 802. The feedback amplifier 802 further includes a non-inverting input to receive the reference voltage 366. The first impedance $Z_1$ and the second impedance $Z_2$ may include any suitable combination of passive elements such as resistors, inductors, and/or capacitors. In an exemplary embodiment, the first impedance $Z_1$ includes a suitable combination of passive elements to implement a low pass filter. The feedback amplifier 802 provides charging error signal 368 that is proportional to a difference between the output voltage 352 and the reference voltage 366.

Figure 9:
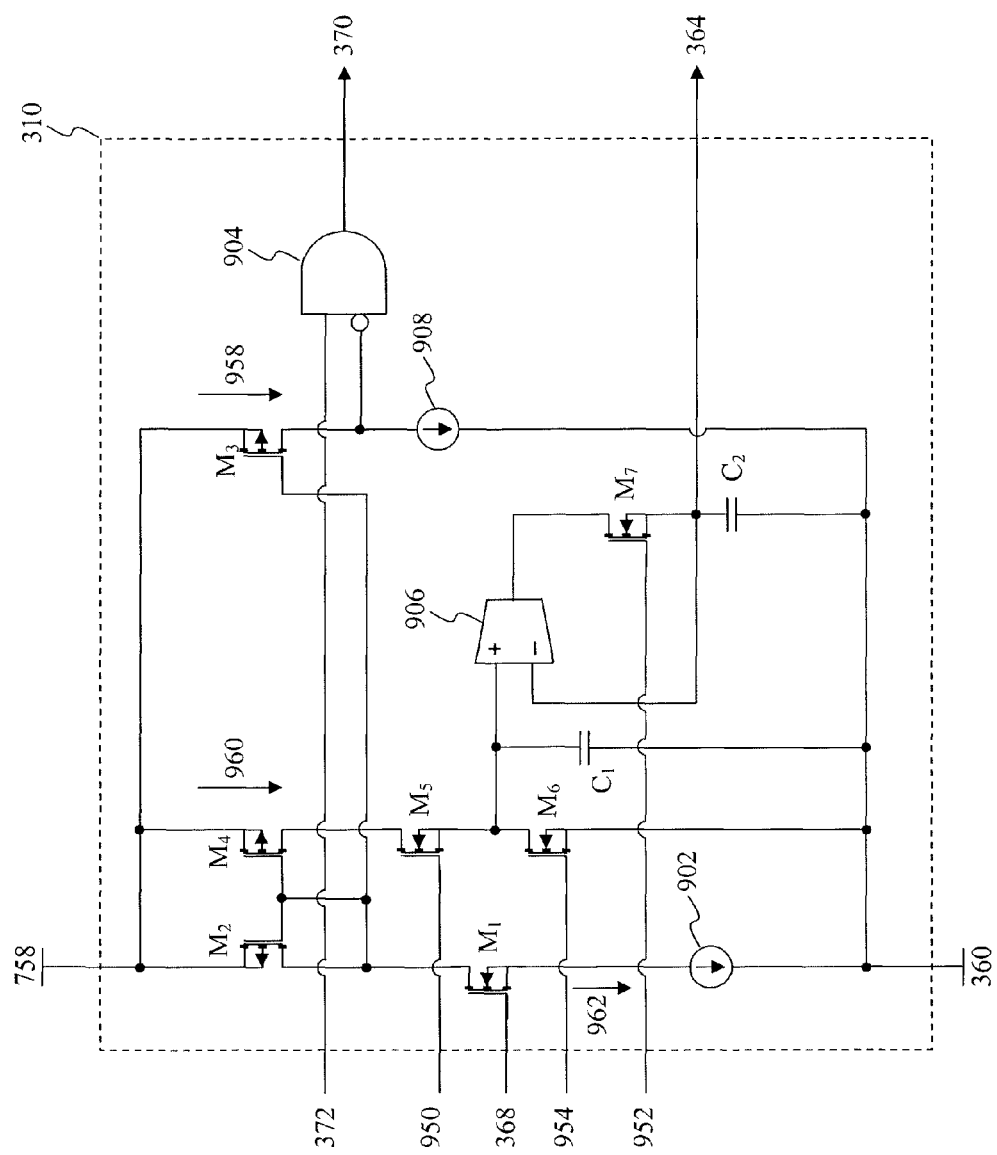
FIG. 9 illustrates a schematic block diagram of a reference generator module used in the first switching charger module according to an exemplary embodiment of the present invention.

Reference Voltage Generator Module Used in the First Switching Charger Module According to an Exemplary Embodiment of the Present Invention FIG. 9 illustrates a schematic block diagram of a reference generator module used in the first switching charger module according to an exemplary embodiment of the present invention. The reference voltage generator module 310 provides the reference voltage 364 based upon the charging error signal 368. The reference voltage generator module 310 may additionally provide the end of charge indicator 370 based upon the zero current indicator 372. More specifically, the reference voltage 364 may be expressed as:

$$V_{REF} = \frac{DI_{REF}T_S}{C_1}, \quad (3)$$

where $I_{REF}$ represents the value of a second replica current 960. As it is noticed, the reference voltage 364 can be assumed proportional to the duty-cycle of the switching charger module 300. When the condition $V_{REF}=V_{C,pk}$ is satisfied, the charge error control signal 562 transitions from the logical value zero to the logical value one. At this transition, the logic module 514 causes the charging transistor $M_C$ to turn off and the discharging transistor $M_D$ to turn on. This in turn determines the duty-cycle. By equating expression (2) and (3), the average charging current $\langle I_{OUT} \rangle$ can be expressed as $$\langle I_{OUT} \rangle = NI_{REF} \quad (4)$$

Accordingly, the average value of the charging current can be controlled by partially sensing the charging current 354. This reduces the system complexity and improves the charging current accuracy.

The reference voltage generator module 310 includes a first current-modulation transistor $M_1$, a first current mirror transistor $M_2$, a second current mirror transistor $M_3$, a third current mirror transistor $M_4$, a first clocking transistor $M_5$, a second clocking transistor $M_6$, a third clocking transistor $M_7$, a first capacitor $C_1$, a second capacitor $C_2$, a first constant current source 902, a logical AND gate 904, a transconductance amplifier 906, and a second constant current source 908.

The first current-modulation transistor $M_1$ passes an operational current 962, substantially equal to the first constant current source 902, to the first current mirror transistor $M_2$ in response to the charging error signal 368. More specifically, the switching charger module 300 operates in the constant current mode of operation when the first current-modulation transistor $M_1$ is operating in a linear region of operation. In this region of operation, the first current-modulation transistor $M_1$ passes the operational current 962 to the first current mirror transistor $M_2$. Alternatively, the switching charger module 300 operates in the constant voltage mode of operation when the first current-modulation transistor $M_1$ is operating in a saturation region of operation. In this region of operation, the first current-modulation transistor $M_1$ passes a scaled representation of the current from the first constant current source 902 to the first current mirror transistor $M_2$. More specifically, in this region of operation, the first constant current source 902, which is the output of a current mirror (not shown), provides a lower current. As a consequence, the current-modulation transistor $M_1$ passes to the first current mirror transistor $M_2$ a reduced current.

The first current mirror transistor $M_2$, the second current mirror transistor $M_3$, and the third current mirror transistor $M_4$ are configured and arranged to form a current mirror such that the first constant current source 902 is mirrored by the second current mirror transistor $M_3$ and the third current mirror transistor $M_4$ in the constant current mode of operation. More specifically, the second current mirror transistor $M_3$ and the third current mirror transistor $M_4$ provides a first replica current 958 and a second replica current 960, respectively, based upon the charging error signal 368, the first replica current 958 and the second replica current 960 being proportional to the first constant current source 902.

The second current mirror transistor $M_3$ passes the first replica current 958 to an inverted input of the logical AND gate 904. The voltage at the inverted input of the logical AND gate 904 is determined by the comparison of the first replica current 958 and the second constant current source 908.

In the constant current mode of operation, having transistor $M_3$ a higher saturation current than the second constant current source 908, a voltage equal to the logical one appears at the inverted input of the logical AND gate 904. The second constant current source 908 represents the output of a current mirror (not shown). The logical AND gate 904 then provides a logical zero as the end of charge indicator 370 regardless of the zero current indicator 372 to indicate the battery is not fully charged. Alternatively, in the constant voltage mode of operation, the first replica current 958 drops below the second constant current source 908 so that a logical zero appears at the first input of the logical AND gate 904. The logical AND gate 904 then provides a logical one as the end of charge indicator 370 when the zero current indicator 372 is at logical one. This indicates that the battery is fully charged and no current is flowing through inductor $L_1$. The switching charger module 300 is hence disabled safely.

The first clocking transistor $M_5$, the second clocking transistor $M_6$, and the third clocking transistor $M_7$ in conjunction with the transconductance amplifier 906 and the first capacitor $C_1$ and the second capacitor $C_2$ provide the reference voltage 364 in response to the charging error signal 368. The generation of the charging error signal 368 will be explained in conjunction with FIG. 10.

Figure 10:
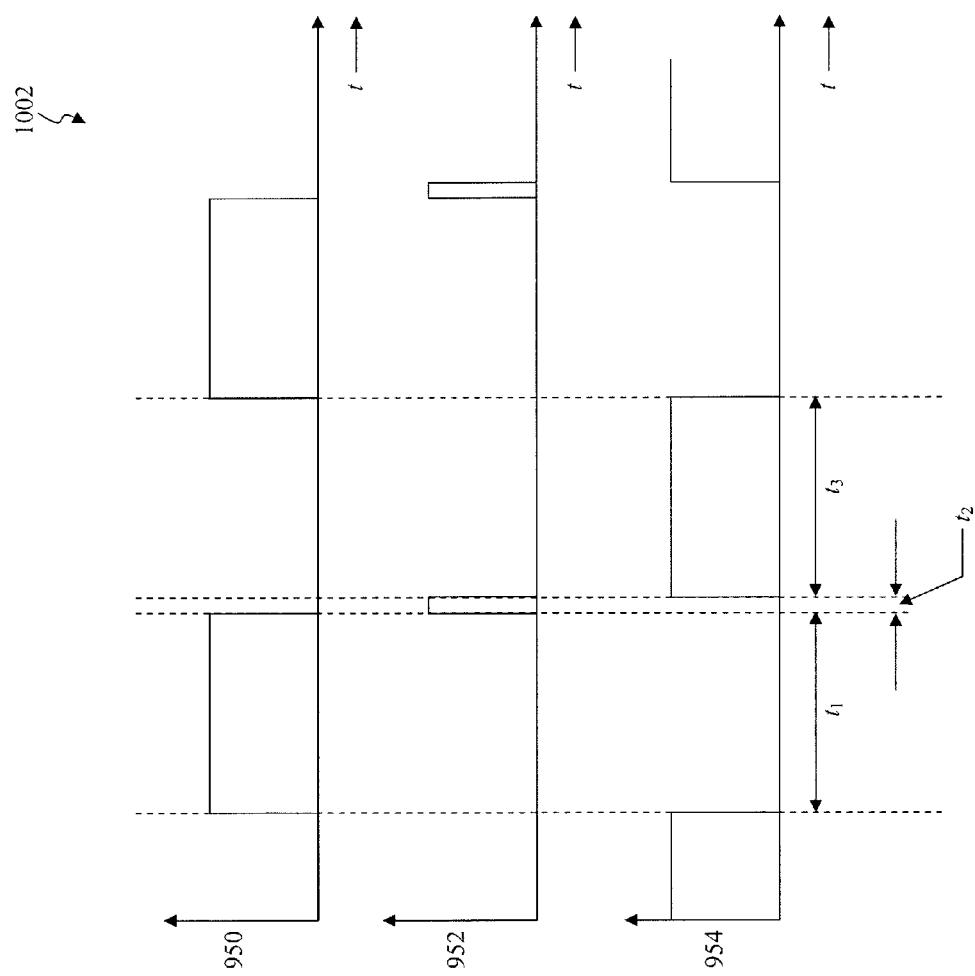
FIG. 10 illustrates a clocking scheme of the reference voltage generator module according to an exemplary embodiment of the present invention.

FIG. 10 illustrates a clocking scheme of the reference voltage generator module according to an exemplary embodiment of the present invention. As illustrated by FIG. 10, a clocking scheme 1002 of the reference voltage generator module 310 includes a first clocking signal 950, a second clocking signal 952, and a third clocking signal 954.

The first clocking signal 950 is at its respective maximum value, such a logical one to provide an example, for a duration of $t_1$ seconds at which the second clocking signal 952 and the third clocking signal 954 are at their respective minimum values, namely logical zeros to provide some examples. The second clocking signal 952 is at its respective maximum value for a duration of $t_2$ seconds at which the first clocking signal 950 and the third clocking signal 954 are at their respective minimum values. The third clocking signal 954 is at its respective maximum value for a duration of $t_3$ seconds at which the first clocking signal 950 and the second clocking signal 952 are at their respective minimum values.

Referring back to FIG. 9, the first clocking transistor $M_5$ passes the second replica current 960 to charge the first capacitor $C_1$ when the first clocking signal 950 is at its respective maximum value. The second clocking transistor $M_6$ then discharges the first capacitor $C_1$ when the third clocking signal 954 is at its respective maximum value. The third clocking transistor $M_7$ charges the second capacitor $C_2$ when the second clocking signal 952 is at its respective maximum value, until the reference voltage 364 is equal to the peak voltage at the non-inverting input of the transconductance amplifier 906 at steady-state.

Second Switching Charger Module Implemented Within the PMU for the Cellular Phone According to a Second Exemplary Embodiment of the Present Invention The controller module 304, as described above, operates in a continuous conduction mode, namely the charging current 354 in the optional inductor $L_1$ does not reach true zero between switching cycles. However, when the battery 312 is almost fully charged, the charging current 354 in the optional inductor $L_1$ may reach true zero, or even switch directions, between switching cycles indicating a discontinuous conduction mode. In the discontinuous conduction mode, the battery 312 begins to provide the charging current 354. As a result equation (4), based on the assumption that the switching charger operates in continuous conduction mode, is not valid.

Figure 11:
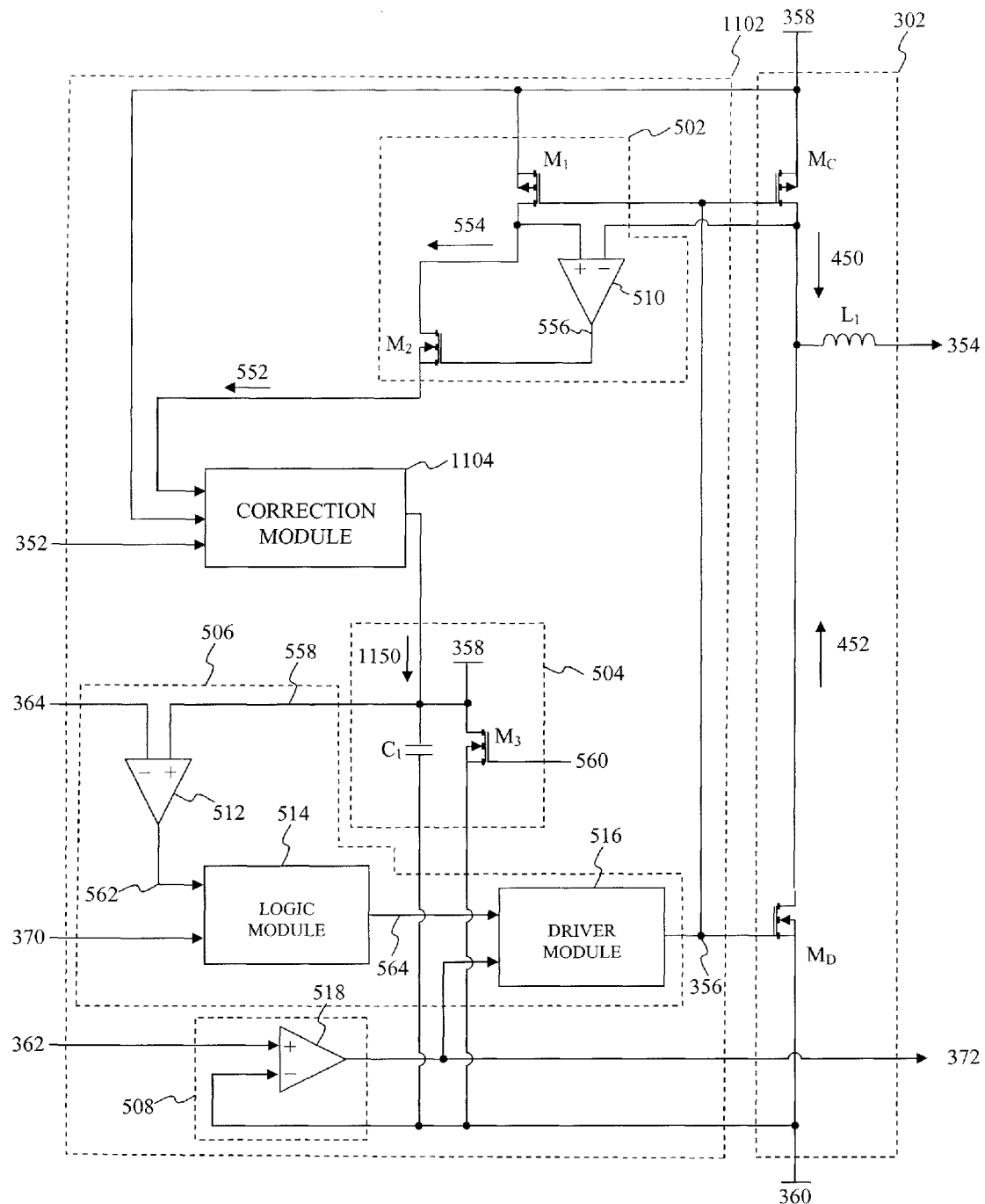
FIG. 11 illustrates a schematic block diagram of a second controller module used in the first switching charger module according to a second exemplary embodiment of the present invention.

FIG. 11 illustrates a schematic block diagram of a second controller module used in the first switching charger module according to a second exemplary embodiment of the present invention. A controller module 1102 includes a correction module 1104 to ensure that the charging current in discontinuous conduction mode satisfies equation (4). The controller module 1102 operates in a substantially similar manner as the controller module 304; therefore only differences between the controller module 304 and the controller module 1102 are to be described in further detail.

The controller module 1102 includes the current replica module 502, the control voltage pulse module 504, the reference voltage module 506, the charge disable module 508, and a correction module 1104. The correction module 1104 provides replica current 1150 based upon the replica current 552, the replica current 1150 being a conjugate of the replica current 552. More specifically, the correction module 1104 operates upon the replica current 552 according to the following mathematical function:

$$U = \frac{XY}{Z}, \qquad (5)$$

where U represents the replica current 1150, X represents the replica current 552, Y represents the first input voltage 358, and Z represents the output voltage 352.

The control voltage pulse module 504 provides the control voltage pulse 558 based upon the scaled charging current 554.

Figure 12:
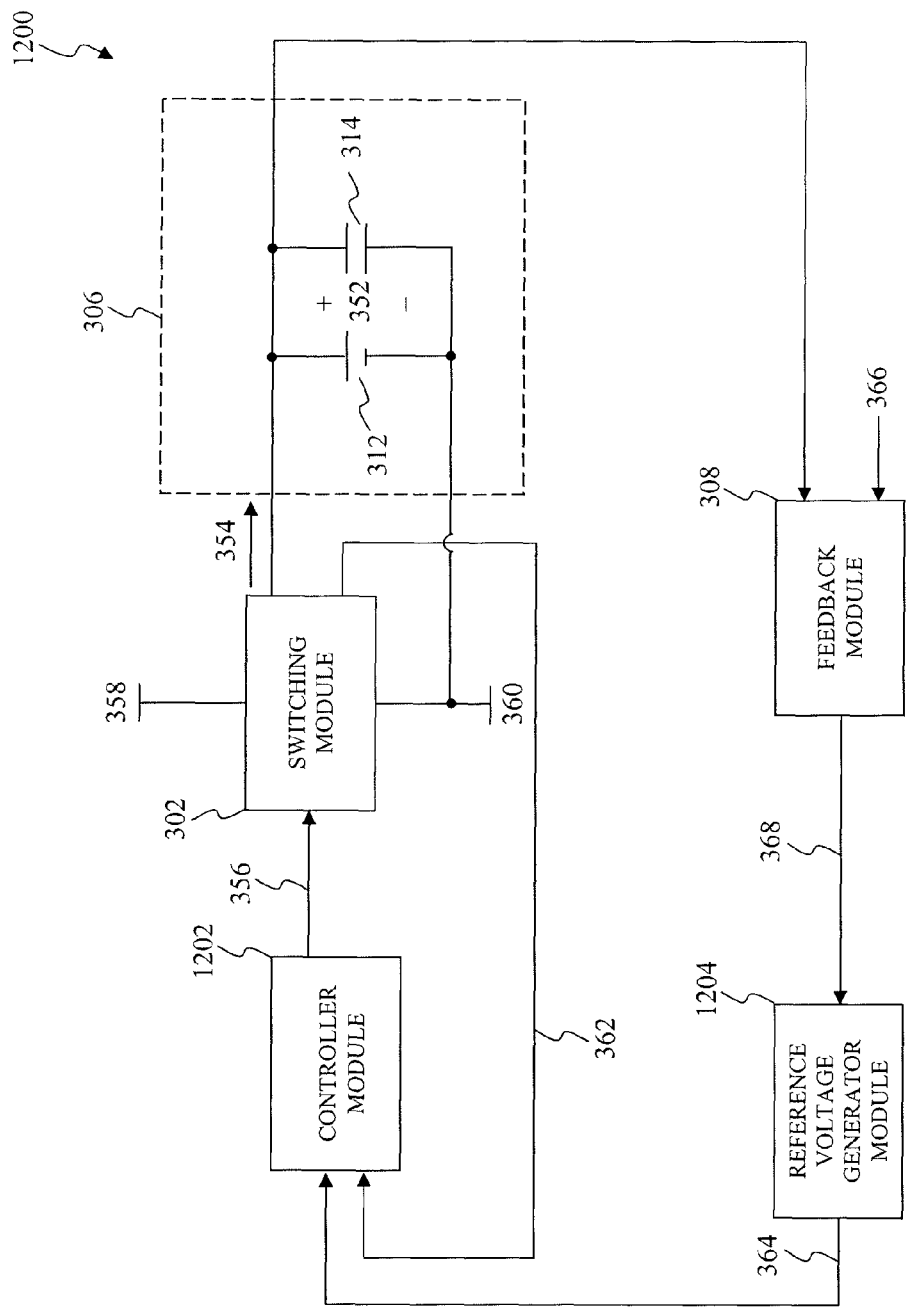
FIG. 12 illustrates a functional block diagram of a second switching charger module used in the power management unit according to a second exemplary embodiment of the present invention

Second Switching Charger Module Implemented Within the PMU for the Cellular Phone According to a Second Exemplary Embodiment of the Present Invention FIG. 12 illustrates a functional block diagram of a second switching charger module used in the power management unit according to a second exemplary embodiment of the present invention. The PMU 110 may include a switching charger module 1200 to restore or recharge one or more cells of a battery, such as the battery 112 to provide an example, using a charging current 354. The one or more cells of the battery convert chemical energy into electrical energy via an electrochemical reaction. The charging current 354 may reverse the electrochemical reaction by converting electrical energy back into chemical energy, thereby allowing the battery to be restored or recharged. The switching charger module 1200 operates in a substantially similar manner as the switching charger module 300; however, the switching charger module 1200 illustrates an alternate end of charge mode of operation as compared to the switching charger module 300. Therefore, only differences between the switching charger module 300 and the switching charger module 1200 are to be described in further detail.

The switching charger module 1200 includes the switching module 302, the load module 306, the feedback module 308, a controller module 1202, and a reference voltage generator module 1204. The controller module 1202 provides the charging control signal 356 based upon a reference voltage 364. Similar to the controller module 304, in the constant current more of operation and/or the constant voltage mode of operation, the controller module 1202 compares the reference voltage 364 to a control voltage. The controller module 1202 provides a logical zero as the charging control signal 356 when the reference voltage 364 is greater than the control voltage. Alternatively, the controller module 1202 provides a logical one as the charging control signal 356 when the reference voltage 364 is less than the control voltage.

The reference voltage generator module 1204 provides the reference voltage 364 based upon the charging error signal 368. More specifically, the reference voltage generator module 1204 provides a reference voltage, given by equation (2) above, as the reference voltage 364 when operating in the constant current mode of operation. Alternatively, the reference voltage generator module 1204 scales the reference voltage and provides this scaled reference voltage as the reference voltage 364 when operating in the constant voltage mode of operation.

Figure 13:
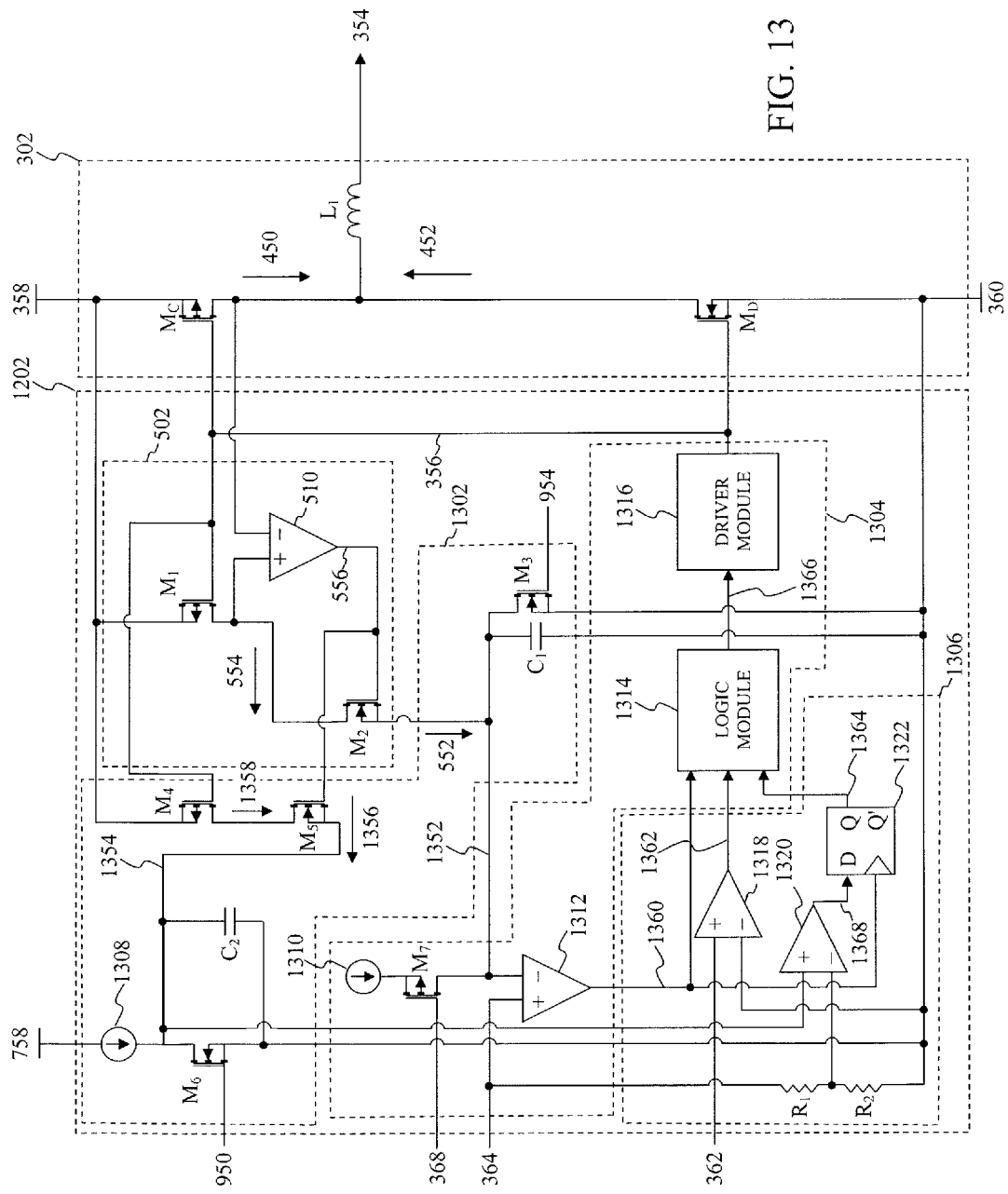
FIG. 13 illustrates a schematic block diagram of a controller module used in the second switching charger module according to an exemplary embodiment of the present invention.

Controller Module Used in the Second Switching Charger Module According to an Exemplary Embodiment of the Present Invention FIG. 13 illustrates a schematic block diagram of a controller module used in the second switching charger module according to an exemplary embodiment of the present invention. The controller module 1202 provides the charging control signal 356 to the switching module 300 based upon the reference voltage 364.

The controller module 1202 includes the current replica module 502, a control voltage module 1302, a charge control module 1304, and an end of charge module 1306. The current replica module 502 observes or senses the element charging current 450 to provide the replica current 552 in a similar manner as described above.

The control voltage module 1302 includes a modulating transistor $M_3$, a scaling transistor $M_4$, a scaling transistor $M_5$, a modulating transistor $M_6$, a constant current source 1308, a first capacitor and a second capacitor $C_2$. The control voltage module 1302 provides a first control voltage pulse 1352 and a second control voltage pulse 1354 based upon the replica current 552 and a second replica current 1356, respectively. The replica current 552 charges the capacitor $C_1$ in response to the third clocking signal 954, as described in FIG. 9 and FIG. 10, to provide the first control voltage pulse 1352. More specifically, the modulating transistor $M_3$ causes the replica current 552 to charge the capacitor $C_1$ when the third clocking signal 954 is at a logical one. Alternatively, the modulating transistor $M_3$ causes the capacitor $C_1$ to discharge when the third clocking signal 954 is at a logical zero. In an exemplary embodiment, the charging and/or discharging of the capacitor $C_1$ in this manner generates a saw tooth pulse as the first control voltage pulse 1352.

The scaling transistor $M_4$ sources a scaled charging current 1358 from the first input voltage 358 in response to the charging control signal 356. The sensing transistor $M_5$ modulates the scaled charging current 1358 based upon the sensing control signal 556 to provide the second replica current 1356, the second replica current 1356 being proportional to the element charging current 450. The second replica current 1356 and/or the constant current source 1308 charges and/or discharges the capacitor $C_2$ in response to the third clocking signal 954 to provide the second control voltage pulse 1354. More specifically, the modulating transistor $M_6$ enables charging of the capacitor $C_2$ when the third clocking signal 954 is at a logical zero. Alternatively, the modulating transistor $M_6$ causes the capacitor $C_2$ to discharge when the third clocking signal 954 is at a logical one. In an exemplary embodiment, the charging and/or discharging of the capacitor $C_2$ in this manner generates a saw tooth pulse as the second control voltage pulse 1354.

The charge control module 1304 provides the charging control signal 356 in response to the reference voltage 364 and the charging error signal 368 in the constant current mode of operation and/or the constant voltage mode of operation. The charge control module 1304 includes a first current-modulation transistor $M_7$, a constant current source 1310, a comparator 1312, a logic module 1314, and a driver module 1316. The first current-modulation transistor $M_7$ passes a current provided by the constant current source 1310 in response to the charging error signal 368. More specifically, the switching charger module 1200 operates in the constant current mode of operation when the first current-modulation transistor $M_7$ is off.

Alternatively, the switching charger module 1200 operates in the constant voltage mode of operation when the first current-modulation transistor $M_7$ is operating in a linear region of operation. In this region of operation, the first current-modulation transistor $M_7$ passes a current from the constant current source 1310 to the capacitor $C_1$. This current from the constant current source 1310 combines with the first control voltage pulse 1352. Since the voltage at the inverting terminal of the comparator 1312 increases, the charge control error signal 1360 forces the duty-cycle of the switching charger module 1200 to decrease, hence reducing the charging current 354.

The comparator 1312 compares the reference voltage 364 and the first control voltage pulse 1352 to provide a charge error control signal 1360. More specifically, the comparator 1312 provides a logical one as the charge error control signal 1360 when the reference voltage 364 is greater than or equal to the first control voltage pulse 1352. Alternatively, the comparator 1312 provides a logical zero as the charge error control signal 1360 when the reference voltage 364 is less than or equal to the first control voltage pulse 1352.

The logic module 1314 provides a charge error control signal 1366 in response to the zero current indicator 1362 and/or end of charge indicator 1364. More specifically, the logic module 1314 allows for switching of the switching module 302 when the end of charge indicator 1364 is a logical zero. Alternatively, the logic module 1314 disables the switching module 302 when the zero current indicator 1362 is a logical one and the end of charge indicator 1364 is a logical one.

The driver module 1316 provides the charging control signal 356 in response to the charge error control signal 1366. The driver module 1316 adjusts a power level of the charge error control signal 564 to ensure that the charging control signal 356 adequately drives the switching module 302.

The end of charge module 1306 provides the zero current indicator 1362 and the end of charge indicator 1364 based upon the sensing voltage 362 and the second control voltage pulse 1354, respectively. The end of charge module 1306 includes a comparator 1318, a comparator 1320, and a latching module 1322. The comparator 1318 compares the sensing voltage 362 with a threshold, such as the second input voltage 360 to provide an example, to provide the zero current indicator 1362. The comparator 1318 provides a logical one as the zero current indicator 1362 when the sensing voltage 362 is greater than or equal to the second input voltage 360. Alternatively, the comparator 1318 provides a logical zero as the zero current indicator 1362 when the sensing voltage 362 is less than to the second input voltage 360.

The comparator 1320 compares the second control voltage pulse 1354 to a scaled representation of the reference voltage 364 to provide an end of charge control 1368, the reference voltage 364 being scaled by a voltage divider represented by resistor $R_1$ and resistor $R_2$. The comparator 1320 provides a logical one as the end of charge control 1368 when the second control voltage pulse 1354 is greater than or equal to the scaled representation of the reference voltage 364. Alternatively, the comparator 1320 provides a logical zero as the end of charge control 1368 when second control voltage pulse 1354 is less than to the scaled representation of the reference voltage 364.

The latching module 1322 provides the end of charge indicator 1364 having one of two possible states, such as a logical zero and a logical one to provide an example, based up the end of charge control 1368 and charge error control signal 1360. In an exemplary embodiment, the latching module 1322 is implemented using a well known D flip-flop. In this exemplary embodiment, the latching module 1322 provides a value of the end of charge control 1368 as the end of charge indicator 1364 when the charge error control signal 1360 is at a logical one. The latching module 1322 holds the value of the end of charge control 1368 as the end of charge indicator 1364 until the charge error control signal 1360 once again is at a logical one.

Figure 14:
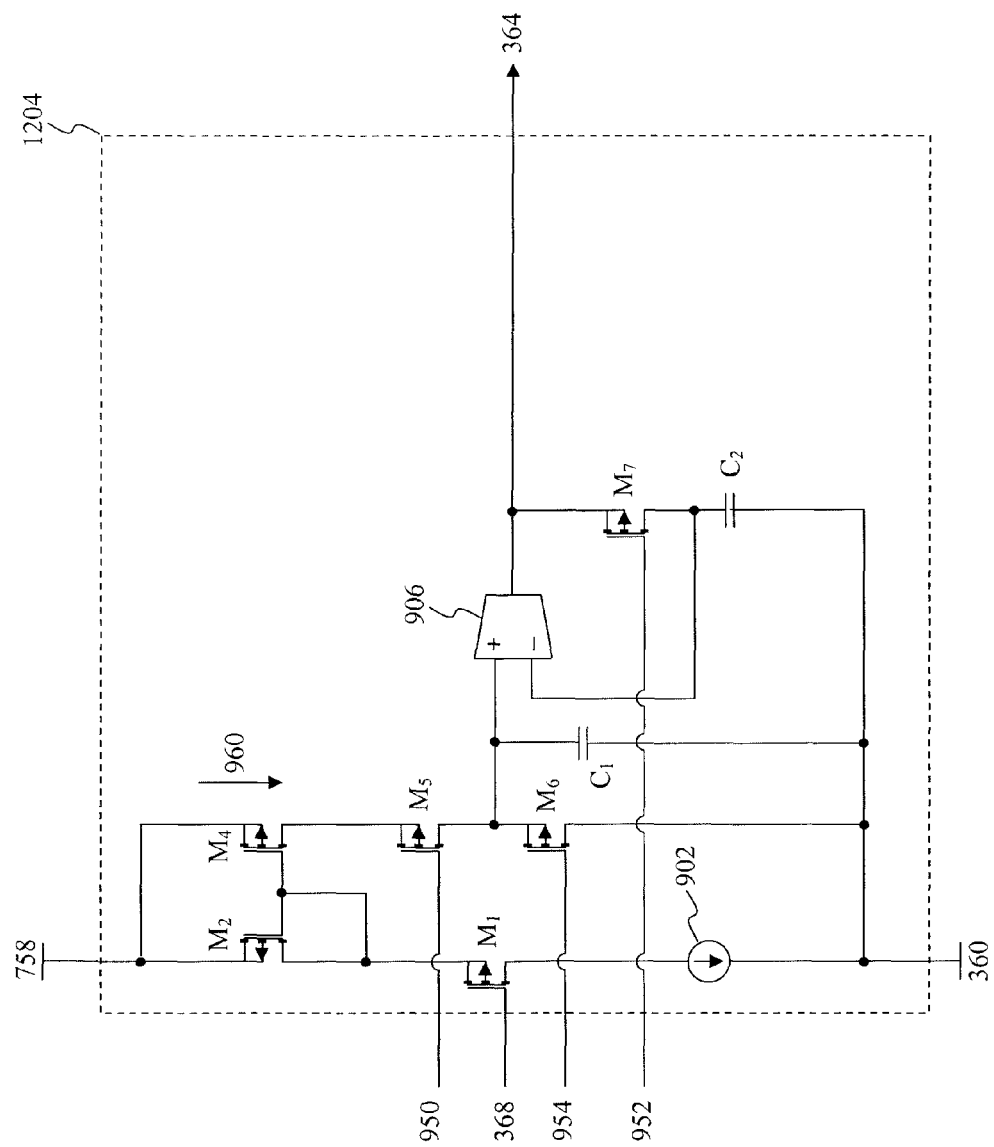
FIG. 14 illustrates a schematic block diagram of a reference generator module used in the switching charger module according to an exemplary embodiment of the present invention.

Reference Voltage Generator Module Used in the Second Switching Charger Module According to an Exemplary Embodiment of the Present Invention FIG. 14 illustrates a schematic block diagram of a reference generator module used in the switching charger module according to an exemplary embodiment of the present invention. The reference voltage generator module 1204 provides the reference voltage 364 based upon the charging error signal 368. The reference voltage generator module 1204 operates in a substantially similar manner as the reference voltage generator module 310 as described in FIG. 9 and FIG. 10; therefore, the reference voltage generator module 1204 is not to be described in further detail.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. An apparatus for charging a battery, comprising:
   a switching module configured to source an element charging current from a first input voltage to the battery when a charging control signal is at a first logical level and to sink an element discharging current from the battery to a second input voltage when the charging control signal is at a second logical level;
   a controller module configured to provide the charging control signal based upon a comparison of a reference voltage and a control voltage pulse, the control voltage pulse being generated by the controller module in response to a replica current, the replica current being proportional to the element charging current;
   a feedback module configured to compare a voltage of the battery to a reference voltage to provide a charging error signal; and
   a reference voltage generator module configured to provide the reference voltage in response to the charging error signal, the reference voltage being proportional to a constant current when the charging error signal indicates a first mode of operation or a scaled representation of the constant current when the charging error signal indicates a second mode of operation.

2. The apparatus of claim 1, wherein the switching module comprises:
   a charging transistor configured to source the element charging current from the first input voltage when the charging control signal is at the first logical level; and
   a discharging transistor configured to sink the element discharging current to the second input voltage when the charging control signal is at the second logical level.

3. The apparatus of claim 1, wherein the controller module comprises:
   a current replica module configured to sense the element charging current to provide the replica current;
   a control voltage pulse module configured to provide the control voltage pulse based upon the replica current; and
   a charge control module configured to provide the charging control signal based upon the comparison of the reference voltage and the control voltage pulse.

4. The apparatus of claim 3, wherein the current replica module comprises:
   a scaling transistor configured to source a scaled charging current from the first input voltage in response to the charging control signal, the scaled charging current being proportional to the element charging current;
   a comparator configured to replicate a voltage drop across a charging transistor to provide a sensing control signal, the charging transistor being configured to provide the element charging current; and
   a sensing transistor configured to modulate the scaled charging current based upon the sensing control signal to provide the replica current.

5. The apparatus of claim 3, wherein the control voltage pulse module comprises:
   a capacitor; and
   a modulating transistor configured to charge the capacitor using the replica current in response to a clocking signal.

6. The apparatus of claim 3, wherein the charge control module comprises:
- a comparator configured to compare the reference voltage and the control voltage pulse to provide a first charge error control signal;
- a logic module configured to increase a duty cycle of the first charge error control signal in response to a clocking signal to provide a second charge error control signal; and
- a driver module configured to adjust a power level of the second charge error control signal to ensure that the charging control signal adequately drives the switching module.

7. The apparatus of claim 1, wherein the feedback module comprises:
- a feedback amplifier configured to compare the voltage of the battery and the reference voltage to provide the charging error signal, the charging error signal indicating a difference between the voltage of the battery and the reference voltage.

8. The apparatus of claim 1, wherein the reference voltage generator module comprises:
- a first current-modulation transistor configured to provide the constant current in first mode of operation or the scaled representation of the constant current in the second mode of operation to provide an operational current;
- a current mirror configured to mirror the operational current to provide a replica current, the replica current being proportional to the operational current;
- a first clocking transistor configured to charge a first capacitor using the replica current in response to a first clocking signal;
- a second clocking transistor configured to discharge the first capacitor in response to a second clocking signal;
- a third clocking transistor configured to charge a first capacitor using the reference voltage in response to a third clocking signal; and
- a transconductance amplifier configured to provide the reference voltage based upon differences in charge stored within the first capacitor and the second capacitor.

9. The apparatus of claim 1, wherein at least one of a group consisting of: the switching module, the controller module, the feedback module, and the reference voltage generator module is implemented as part of a power management unit (PMU) of a cellular phone.

10. The apparatus of claim 1, wherein at least one of a group consisting of: the switching module, the controller module, the feedback module, and the reference voltage generator module is implemented as part of a single chip or die.

11. The apparatus of claim 1, wherein at least two of a group consisting of the switching module, the controller module, the feedback module, and the reference voltage generator module are implemented as part of a common chip or die.

12. A method for charging a battery, comprising:
(a) sourcing an element charging current from a first input voltage to the battery when a charging control signal is at a first logical level;
(b) sinking an element discharging current from the battery to a second input voltage when the charging control signal is at a second logical level;
(c) comparing a reference voltage and a control voltage pulse to provide the charging control signal, the control voltage pulse being generated by a controller module in response to a replica current, the replica current being proportional to the element charging current;
(d) comparing a voltage of the battery to a reference voltage to provide a charging error signal; and
(e) generating the reference voltage in response to the charging error signal, the reference voltage being proportional to a constant current when the charging error signal indicates a first mode of operation or a scaled representation of the constant current when the charging error signal indicates a second mode of operation.

13. The method of claim 12, wherein step (a) comprises:
(a)(i) using a charging transistor to source the element charging current to the battery when the charging control signal is at the first logical level, and wherein step (b) comprises:
(b)(i) using a discharging transistor to sink the element discharging current to the second input voltage when the charging control signal is at the second logical level.

14. The method of claim 12, wherein step (c) comprises:
(c)(i) sensing the element charging current to provide the replica current;
(c)(ii) generating the control voltage pulse based upon the replica current; and
(c)(iii) comparing the reference voltage and the control voltage pulse to provide the charging control signal.

15. The method of claim 14, wherein step (c)(i) comprises:
(c)(i)(A) sensing the element charging current to provide a scaled charging current from the first input voltage in response to the charging control signal, the scaled charging current being proportional to the element charging current;
(c)(i)(B) replicating a voltage drop across a charging transistor to provide a sensing control signal, the charging transistor being configured to provide the element charging current; and
(c)(i)(C) modulating the scaled charging current based upon the sensing control signal to provide the replica current.

16. The method of claim 14, wherein step (c)(ii) comprises:
(c)(ii)(A) charging a capacitor using the replica current in response to a clocking signal.

17. The method of claim 14, wherein step (c)(iii) comprises:
(c)(iii)(A) comparing the reference voltage and the control voltage pulse to provide a first charge error control signal;
(c)(iii)(B) increasing a duty cycle of the first charge error control signal in response to a clocking signal to provide a second charge error control signal; and
(c)(iii)(C) adjusting a power level of the second charge error control signal to ensure that the charging control signal adequately drives the switching module.

18. The method of claim 12, wherein step (d) comprises:
(d) comparing the voltage of the battery and the reference voltage to provide the charging error signal, the charging error signal indicating a difference between the voltage of the battery and the reference voltage.

* * * * *